US012776869B2

(12) United States Patent
Noh et al.

(10) Patent No.: US 12,776,869 B2
(45) Date of Patent: Oct. 27, 2026

(54) CHANNEL ACCESS METHOD FOR PERFORMING TRANSMISSION IN UNLICENSED BAND, AND APPARATUS USING SAME

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 426 days.

(21) Appl. No.: 17/599,553

(22) PCT Filed: Mar. 30, 2020

(86) PCT No.: PCT/KR2020/004383
§ 371 (c)(1),
(2) Date: Sep. 29, 2021

(87) PCT Pub. No.: WO2020/204563
PCT Pub. Date: Oct. 8, 2020

(65) Prior Publication Data

US 2022/0150979 A1 May 12, 2022

(30) Foreign Application Priority Data

Mar. 29, 2019 (KR) ........................ 10-2019-0037416
May 2, 2019 (KR) ........................ 10-2019-0051792

(51) Int. Cl.
*H04W 74/0808* (2024.01)
*H04L 5/00* (2006.01)
(Continued)

(52) U.S. Cl.
CPC ......... *H04L 5/0007* (2013.01); *H04W 74/002* (2013.01); *H04W 74/0808* (2013.01); *H04W 74/0833* (2013.01)

(58) Field of Classification Search
CPC ............ H04L 5/0007; H04W 72/0446; H04W 72/0453; H04W 72/23; H04W 72/1268;
(Continued)

(56) References Cited

U.S. PATENT DOCUMENTS

2019/0246412 A1* 8/2019 Noh ...................... H04W 84/12
2020/0275484 A1* 8/2020 Xu .................... H04W 72/0453
(Continued)

FOREIGN PATENT DOCUMENTS

WO WO-2018021783 A1 * 2/2018 ............ H04L 27/26

OTHER PUBLICATIONS

WO-2018021783_Machine Translation (Year: 2018).*
(Continued)

*Primary Examiner* — Harun Chowdhury
(74) *Attorney, Agent, or Firm* — WOMBLE BOND DICKINSON (US) LLP

(57) ABSTRACT

Base stations for wireless communication systems are disclosed. Each base station for wireless communication comprises a communication module and a processor. The processor performs random backoff-based channel access on multiple carriers, and performs transmission by using, among the multiple carriers, a carrier on which the channel access is successful. Each of the multiple carriers includes multiple listen before talk (LBT) subbands, wherein the LBT subband refers to a unit bandwidth for performing an LBT process.

7 Claims, 17 Drawing Sheets

(51) Int. Cl.
*H04W 74/00* (2009.01)
*H04W 74/0833* (2024.01)

(58) Field of Classification Search
CPC ........... H04W 74/006; H04W 74/0808; H04W 74/0833
USPC ................................. 370/252, 328, 329, 331
See application file for complete search history.

(56) References Cited

U.S. PATENT DOCUMENTS

2020/0280465 A1* 9/2020 Kim ...................... H04L 5/0007
2020/0374236 A1* 11/2020 Li ......................... H04L 1/1861

OTHER PUBLICATIONS

International Search Report for PCT/KR2020/004383 mailed on Jul. 8, 2020 and its English translation from WIPO (now published as WO 2020/204563).

Written Opinion of the International Searching Authority for PCT/KR2020/004383 mailed on Jul. 8, 2020 and its English translation by Google Translate (now published as WO 2020/204563).

Vivo: "Discussion on the channel access procedures" R1-1900110, 3GPP TSG RAN WG1 Ad-Hoc Meeting 1901, Taipei, Jan. 12, 2019. See pp. 1-6.

Huawei, HiSilicon: "Coexistence and channel access for NR unlicensed band operations" R1-1801371, 3GPP TSG RAN WG1 Meeting #92, Athens, Greece, Feb. 17, 2018. See pp. 1-6.

Qualcomm Incorporated: "Channel access procedures for NR unlicensed", R1-1900873, 3GPP TSG WG1 Meeting #AH1901, Taipei, Taiwan, Jan. 12, 2019. See pp. 1-13.

CATT: "Channel Access Procedures for NR Unlicensed Operations", R1-1813281, 3GPP TSG RAN WG1 Meeting #95, Spokane, USA, Nov. 3, 2018. See pp. 1-6.

Nokia et al.: "Feature Lead's Summary on Channel Access Procedures", R1-1811959, 3GPP TSG RAN WG1 #94bis, Chengdu, China, Oct. 10, 2018. See pp. 1-17.

Office Action (1st) dated May 22, 2026 for Korean Patent Application No. 10-2021-7031127 and its English translation provided by Applicant's foreign counsel.

* cited by examiner (a)

(b)

CHANNEL ACCESS METHOD FOR PERFORMING TRANSMISSION IN UNLICENSED BAND, AND APPARATUS USING SAME

CROSS-REFERENCE TO RELATED APPLICATIONS

This application is a continuation the U.S. National Stage of pending PCT International Application No. PCT/KR2020/004383, which was filed on Mar. 30, 2020, and which claims priority under 35 U.S.C 119 (a) to Korean Patent Application No. 10-2019-0037416 filed with the Korean Intellectual Property Office on Mar. 29, 2019, and Korean Patent Application No. 10-2019-0051792 filed with the Korean Intellectual Property Office on May 2, 2019. The disclosures of the above patent applications are incorporated herein by reference in their entirety.

TECHNICAL FIELD

The present disclosure relates to a wireless communication system. More specifically, the present disclosure relates to a channel access method in a wireless communication system operating in an unlicensed band, and an apparatus using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a scheme that uses an unlicensed frequency spectrum or an unlicensed frequency band (e.g., a 2.4 GHz band, a 5 GHz band, a 6 GHz band, a 52.6 GHz or more band, or the like) for providing a cellular communication service has been discussed as a solution to a spectrum shortage problem.

Unlike a licensed band in which a communication business operator secures an exclusive frequency use right through a procedure such as auction, or the like, in the unlicensed band, multiple communication devices can be simultaneously used without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., a wireless LAN device) using the unlicensed band may occur.

Research into a coexistence scheme with the conventional unlicensed band device and a scheme of efficiently sharing a radio channel with other wireless communication devices needs to be preceded in order to use an LTE and NR technology in the unlicensed band. That is, a robust coexistence mechanism (RCM) needs to be developed in order to prevent a device using the LTE and NR technology in the unlicensed band from influencing the conventional unlicensed band device.

DISCLOSURE OF INVENTION

Technical Problem

The present disclosure is to provide a channel access method for providing downlink transmission and uplink transmission in a wireless communication system operating in an unlicensed band, and an apparatus using the same.

Solution to Problem

According to an embodiment of the present disclosure, a wireless communication apparatus configured to perform wireless communication in an unlicensed band includes: a communication module; and a processor configured to control the communication module. The processor performs random backoff-based channel access in multiple carriers, and performs transmission using a carrier in which channel access has been successfully performed, among the multiple carriers. Each of the multiple carriers includes multiple listen before talk (LBT) subbands, and each of the LBT subbands indicates a unit bandwidth in which an LBT process is performed.

The processor may configure a random integer obtained from uniform distribution within a contention window (CW), as an initial value of a backoff counter, maintain and manage a size of at least one contention window (CW) for each of the multiple carriers, and performs the random backoff-based channel access for each carrier in each of the multiple carriers. The backoff counter may correspond to a value for determining a standby time of the random backoff-based channel access.

The processor may maintain and manage multiple backoff counters corresponding to multiple LBT subbands, respectively, the multiple LBT subbands are included in in each of the multiple carriers.

The multiple carriers may include a first carrier which includes an LBT subband corresponding to a first backoff counter, and a second carrier which does not include an LBT subband corresponding to the first backoff counter. The processor may selectively reduce a value of the first backoff counter on the basis of a value of a backoff counter corresponding to the LBT subband included in the first carrier, regardless of a value of a backoff counter corresponding to the LBT subband included in the second carrier.

When maintaining and managing multiple CWs corresponding to the multiple LBT subbands, the processor may obtain a random integer from uniform distribution within a largest value among the multiple CWs corresponding to the multiple LBT subbands, and configure the obtained random integer as a common initial value of the multiple backoff counters corresponding to the multiple LBT subbands.

The processor may perform the random backoff-based channel access in only one LBT subband in each of the multiple carriers.

The processor may maintain only one CW in each of the multiple carriers, and adjust a size of one CW in each of the multiple carriers on the basis of whether transmission in each of the multiple carriers has been successfully performed.

According to an embodiment of the present disclosure, a wireless communication apparatus configured to perform wireless communication in an unlicensed band includes: a communication module; and a processor configured to control the communication module. The processor randomly selects, as a listen before talk (LBT) subband for each carrier, one of multiple LBT subbands composing each of multiple carriers, from each of the multiple carriers by using uniform probability, randomly selects, as an LBT subband for random backoff-based channel access, one of the multiple LBT subbands for each carrier by using the uniform probability, and performs the random backoff-based channel access in the LBT subband for the random backoff-based channel access. The LBT subband indicates a unit bandwidth in which an LBT process is performed.

According to an embodiment of the present disclosure, an operation method of a wireless communication apparatus configured to perform wireless communication in an unlicensed band includes: performing random backoff-based channel access in multiple carriers; and performing transmission using a carrier in which channel access has been successfully performed, among the multiple carriers. Each of the multiple carriers includes multiple listen before talk (LBT) subbands, and each of the LBT subbands indicates a unit bandwidth in which an LBT process is performed.

The performing of the random backoff-based channel access may include: configuring a random integer obtained from uniform distribution within a contention window (CW), as an initial value of a backoff counter; maintaining and managing a size of at least one contention window (CW) for each of the multiple carriers; and performing the random backoff-based channel access for each carrier in each of the multiple carriers. The backoff counter may correspond to a value for determining a standby time of the random backoff-based channel access.

The performing of the random backoff-based channel access for each carrier in each of the multiple carriers may include maintaining and managing multiple backoff counters corresponding to multiple LBT subbands, respectively, the multiple LBT subbands are included in each of the multiple carriers.

The multiple carriers may include a first carrier which includes an LBT subband corresponding to a first backoff counter, and a second carrier which does not include an LBT subband corresponding to the first backoff counter. In this case, the maintaining and managing of multiple backoff counters corresponding to multiple LBT subbands, respectively, the multiple LBT subbands composing each of the multiple carriers, may include selectively reducing a value of the first backoff counter on the basis of a value of a backoff counter corresponding to the LBT subband included in the first carrier, regardless of a value of a backoff counter corresponding to the LBT subband included in the second carrier.

The maintaining and managing of multiple backoff counters corresponding to multiple LBT subbands, respectively, the multiple LBT subbands composing each of the multiple carriers, may include obtaining a random integer from uniform distribution within a largest value among CWs of the multiple backoff counters corresponding to the multiple LBT subbands, and configuring the obtained random integer as a common initial value of the multiple backoff counters corresponding to the multiple LBT subbands.

The performing of the random backoff-based channel access for each carrier in each of the multiple carriers may include performing the random backoff-based channel access in only one LBT subband in each of the multiple carriers.

The maintaining and managing of a size of at least one contention window (CW) for each of the multiple carriers may include maintaining only one CW in each of the multiple carriers, and adjusting a size of one CW in each of the multiple carriers on the basis of whether transmission in each of the multiple carriers has been successfully performed.

Advantageous Effects of Invention

An embodiment of the present disclosure provides a channel access method for transmission including a discovery reference signal in a wireless communication system operating in an unlicensed band, and an apparatus using the same.

Advantageous effects obtainable in the present specification are not limited to the above-mentioned advantageous effects, and other advantageous effects not mentioned herein may be clearly understood by a person skilled in the art to which the present disclosure pertains from the following description.

BEST MODE FOR CARRYING OUT THE INVENTION

Figure 1:
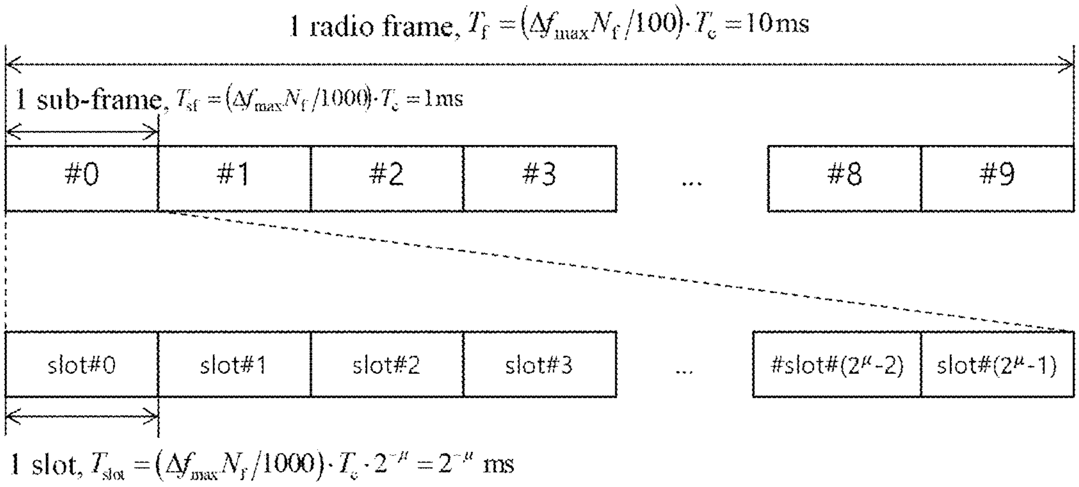
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is “connected” to another element, the element may be “directly connected” to the other element or “electrically connected” to the other element through a third element. Further, unless explicitly described to the contrary, the word “comprise” will be understood to imply the inclusion of stated elements but not the exclusion of any other elements unless otherwise stated. Moreover, limitations such as “more than or equal to” or “less than or equal to” based on a specific threshold may be appropriately substituted with “more than” or “less than”, respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max}N_f/100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and μ can have a value of μ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
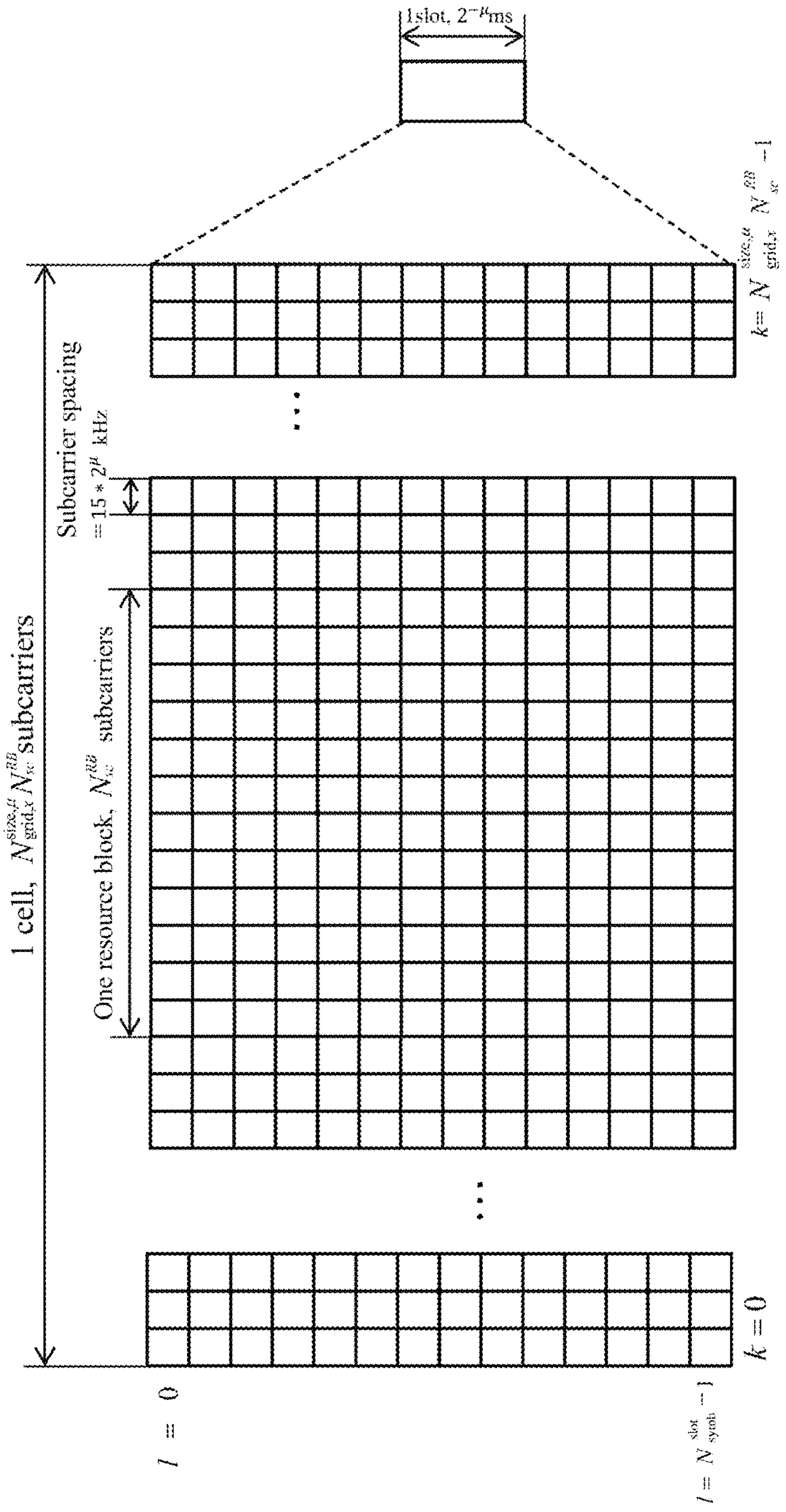
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain. [62] In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | D | X | X | X | X | U |
| 16 | D | X | X | X | X | X | X | X | X | X | X | X | X | X | 44 | D | D | D | D | D | D | X | X | X | X | X | X | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | X | U | D | D | D | D | X | X | U |
| 22 | D | X | X | X | X | X | X | X | X | X | X | X | U | U | 50 | D | D | X | X | U | U | U | D | D | X | X | U | U | U |
| 23 | D | D | X | X | X | X | X | X | X | X | X | X | U | U | 51 | D | X | X | U | U | U | U | D | X | X | U | U | U | U |
| 24 | D | D | D | X | X | X | X | X | X | X | X | X | U | U | 52 | D | X | X | X | X | X | U | D | X | X | X | X | X | U |
| 25 | D | X | X | X | X | X | X | X | X | X | X | U | U | U | 53 | D | D | X | X | X | X | U | D | D | X | X | X | X | U |
| 26 | D | D | X | X | X | X | X | X | X | X | X | U | U | U | 54 | X | X | X | X | X | X | X | D | D | D | D | D | D | D |
| 27 | D | D | D | X | X | X | X | X | X | X | X | U | U | U | 55 | D | D | X | X | X | U | U | U | D | D | D | D | D | D |
| 56~255 | Reserved | | | | | | | | | | | | | | | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
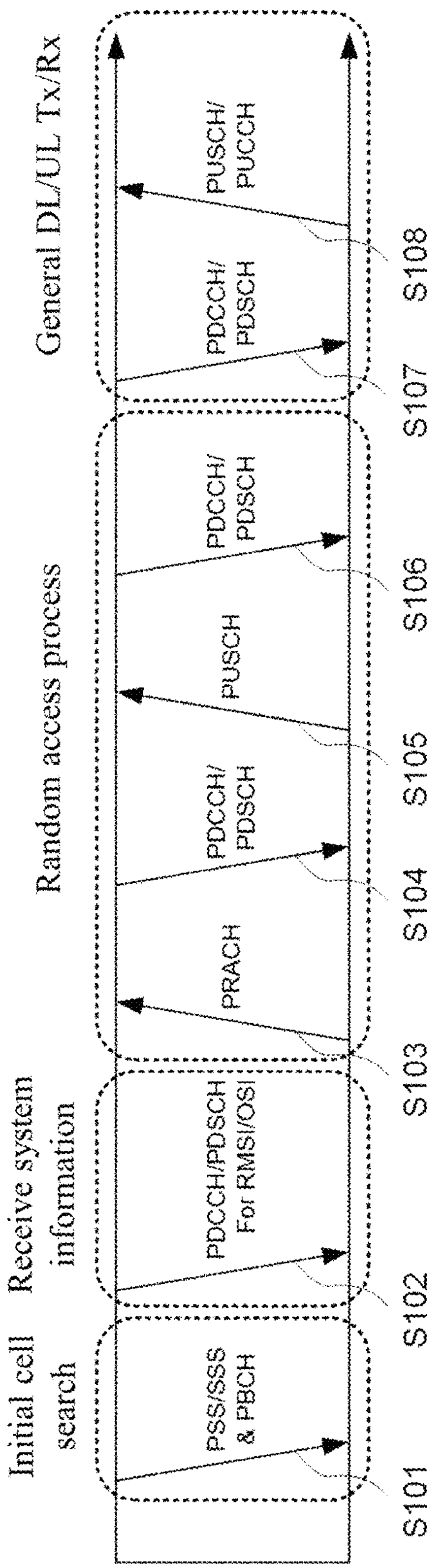
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
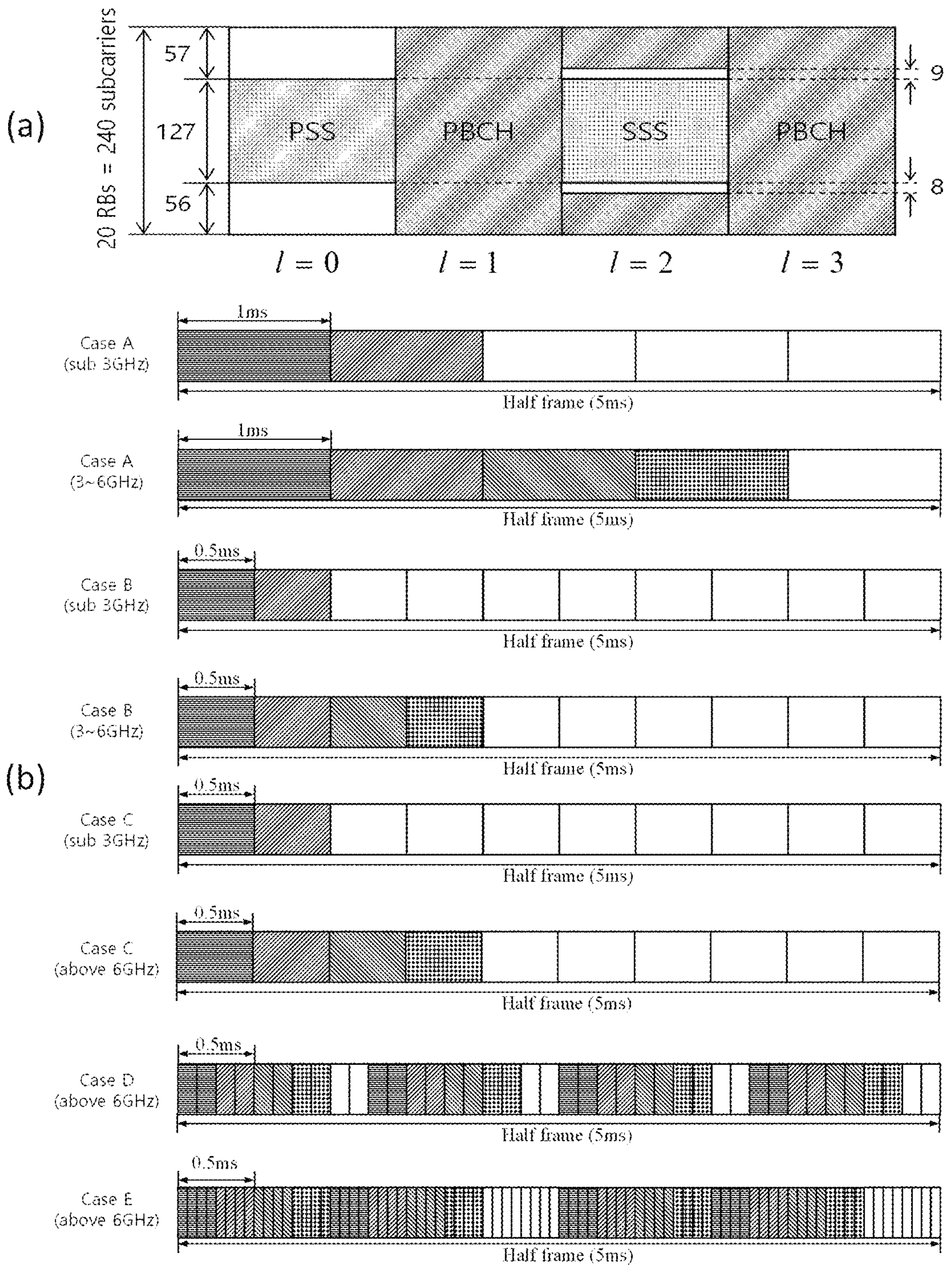
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(*a*), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(*a*) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N_{ID}^{(2)}\right) \bmod 127$$

$$0 \le n < 127$$

Here, x(i+7)=(x(i+4)+x(i))mod 2 and is given as, $$[x(6)\ \ x(5)\ \ x(4)\ \ x(3)\ \ x(2)\ \ x(1)\ \ x(0)] = [1\ \ 1\ \ 1\ \ 0\ \ 1\ \ 1\ \ 0]$$

Further, the sequence $d_{SSS}(n)$ of the SSS is as follows.

$$d_{SSS}(n) = [1 - 2x_0((n + m_0)\mathrm{mod}127)][1 - 2x_1((n + m_1)\mathrm{mod}127)]$$

$$m_0 = 15\left\lfloor \frac{N_{ID}^{(1)}}{112} \right\rfloor + 5N_{ID}^{(2)}$$

$$m_1 = (N_{ID}^{(1)})\mathrm{mod}112$$

$$0 \le n < 127$$

Here, $$x_0(i+7) = (x_0(i+4) + x_0(i))\mathrm{mod}2$$

$$x_1(i+7) = (x_1(i+1) + x_1(i))\mathrm{mod}2$$

and is given as, $$[x_0(6)\ \ x_0(5)\ \ x_0(4)\ \ x_0(3)\ \ x_0(2)\ \ x_0(1)\ \ x_0(0)] = [0\ \ 0\ \ 0\ \ 0\ \ 0\ \ 0\ \ 1]$$

$$[x_1(6)\ \ x_1(5)\ \ x_1(4)\ \ x_1(3)\ \ x_1(2)\ \ x_1(1)\ \ x_1(0)] = [0\ \ 0\ \ 0\ \ 0\ \ 0\ \ 0\ \ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
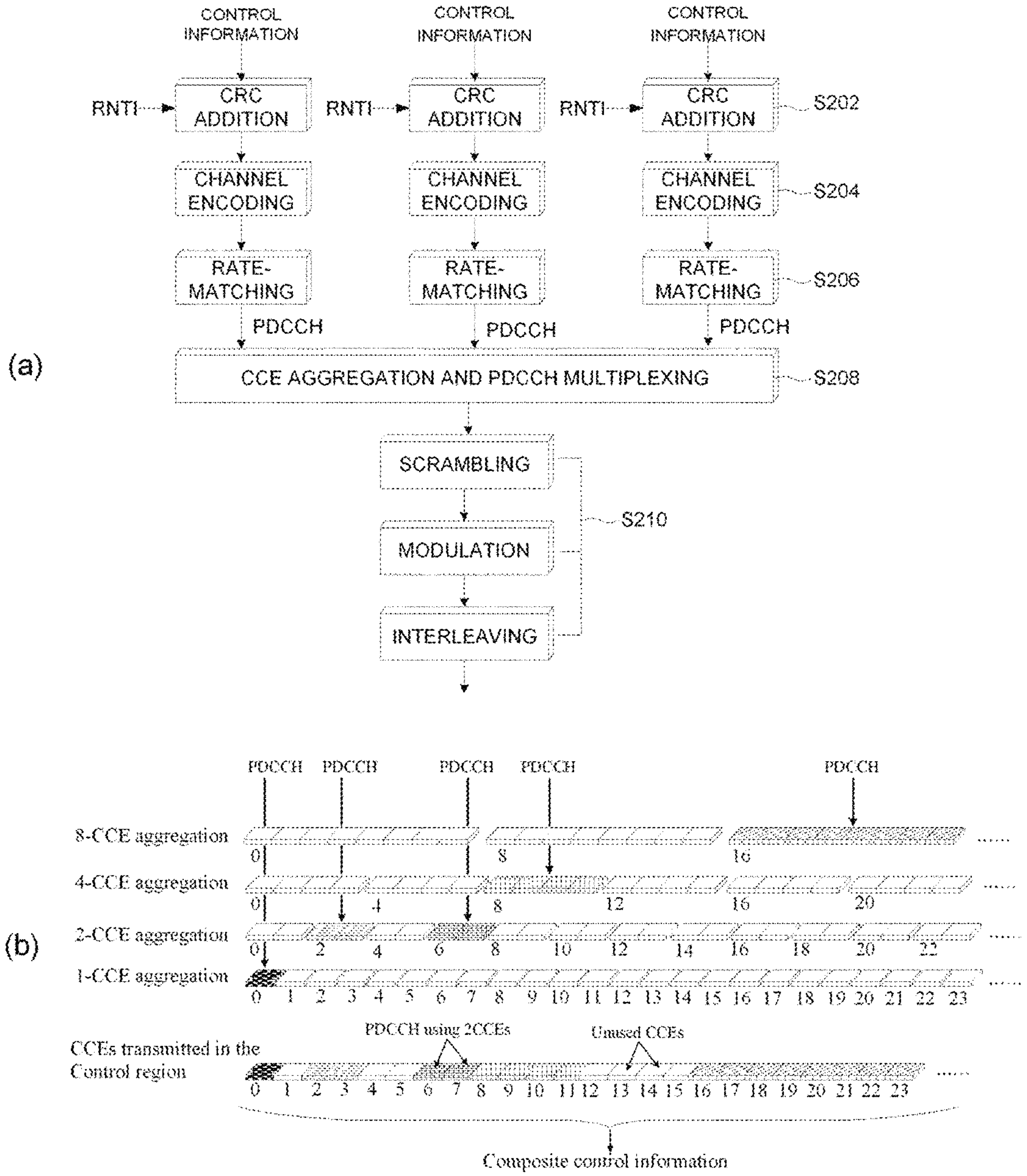
FIG. 5 illustrates a procedure for transmitting control information and a control channel in a 3GPP NR system.

FIG. 5 illustrates a procedure for transmitting control information and a control channel in a 3GPP NR system. Referring to FIG. 5(*a*), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(*b*) is a diagram related to a CCE aggregation level and the multiplexing of a PDCCH and illustrates the type of a CCE aggregation level used for one PDCCH and CCE(s) transmitted in the control area according thereto.

Figure 6:
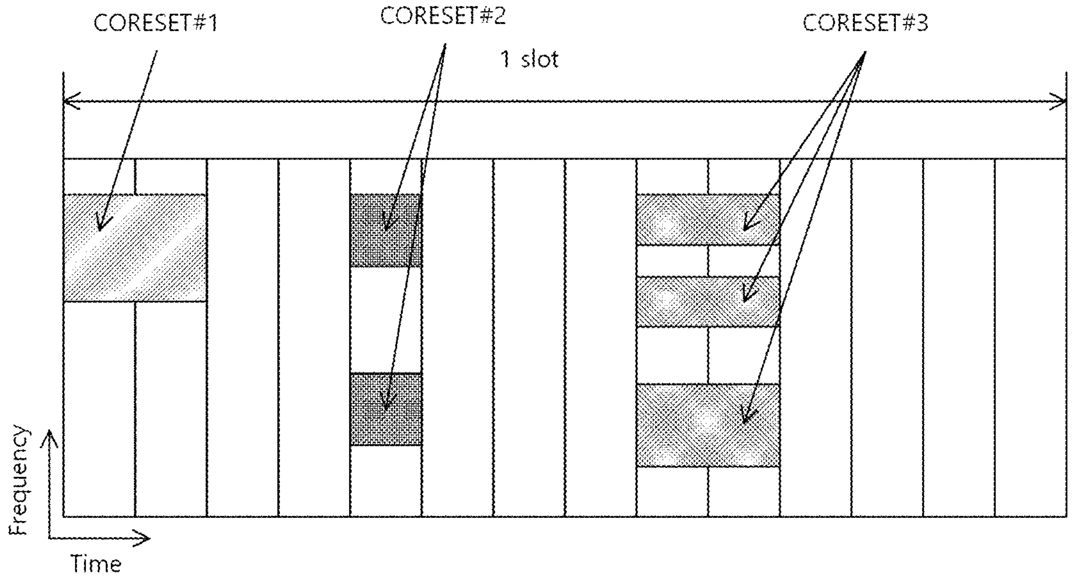
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
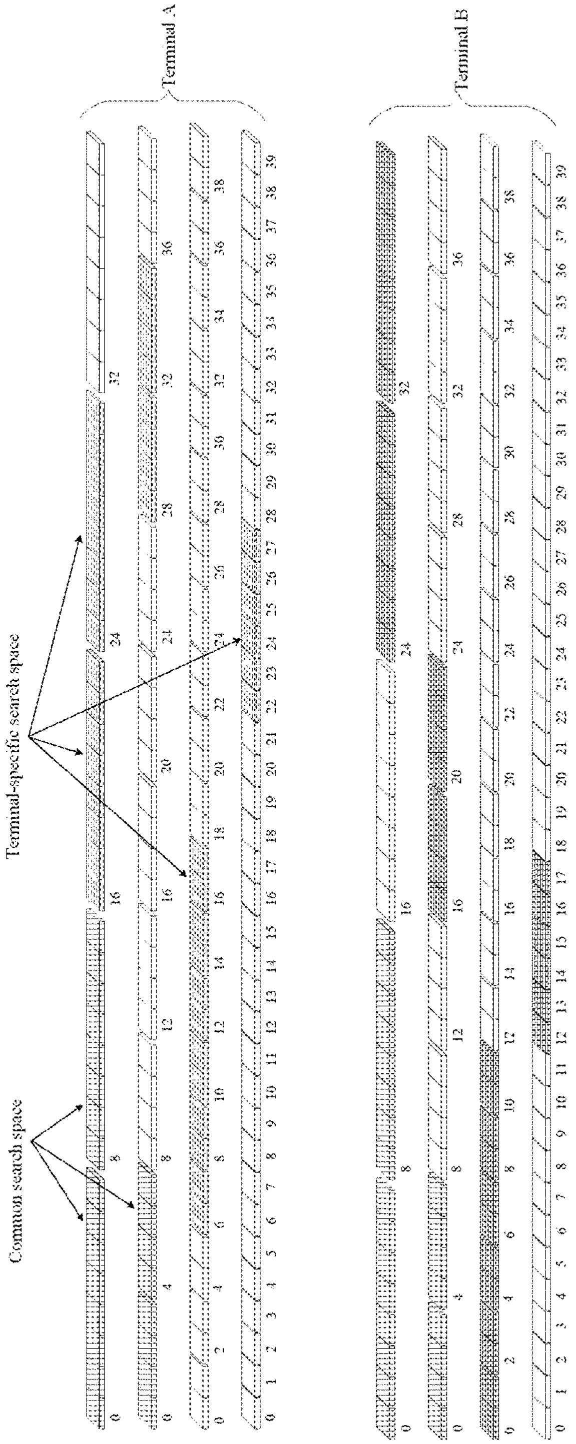
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}/2$. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}/2$. The UE may not apply block-unit spreading to the PUCCH format 3. However, the UE may apply block-unit spreading to one RB (i.e., 12 subcarriers) using PreDFT-OCC of a length of such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
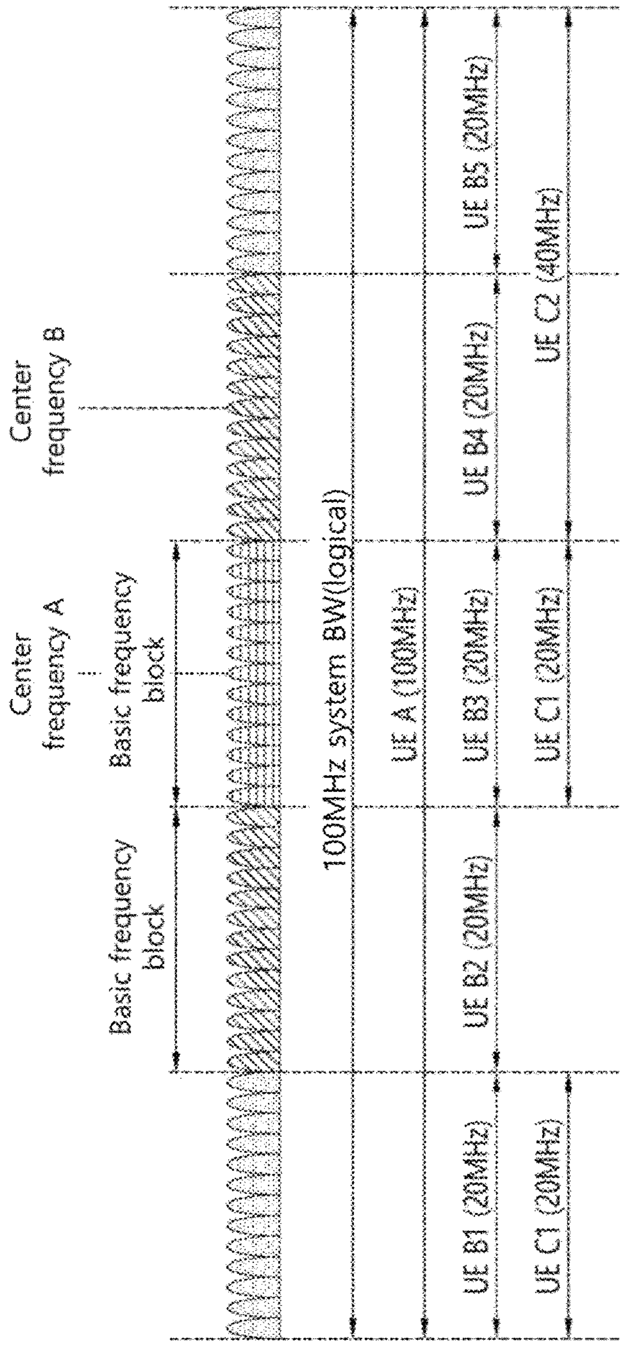
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
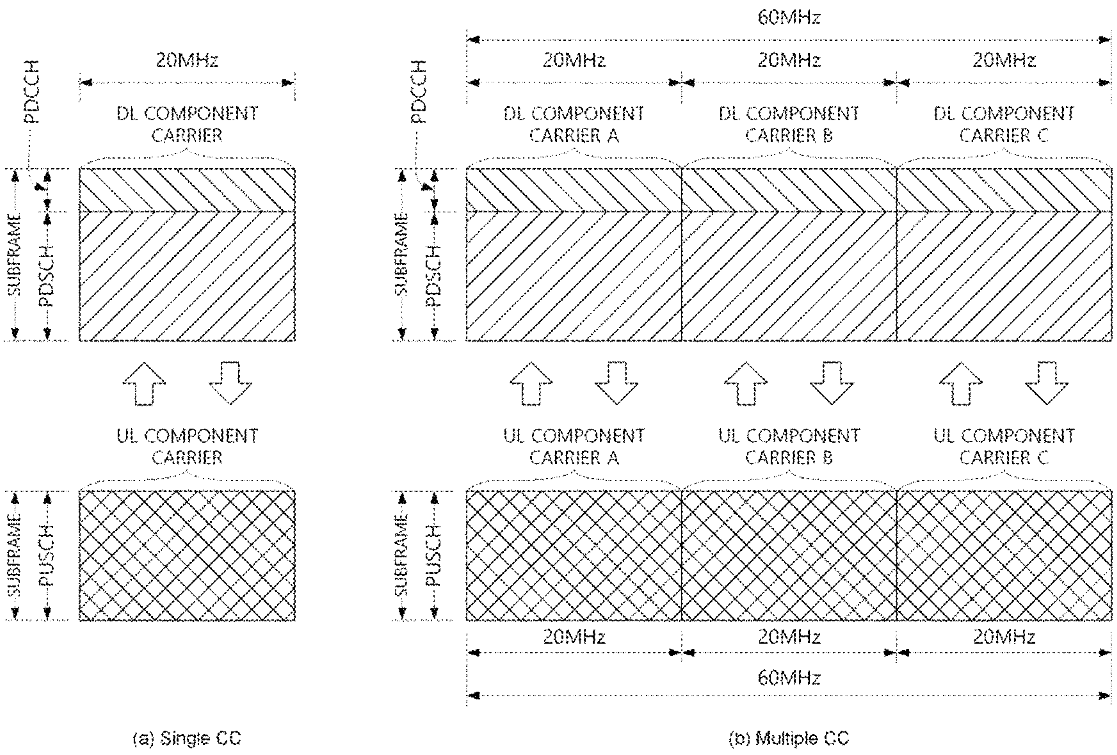
FIG. 9 is a diagram for explaining signal carrier communication and multiple carrier communication.

FIG. 9 is a drawing for explaining signal carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
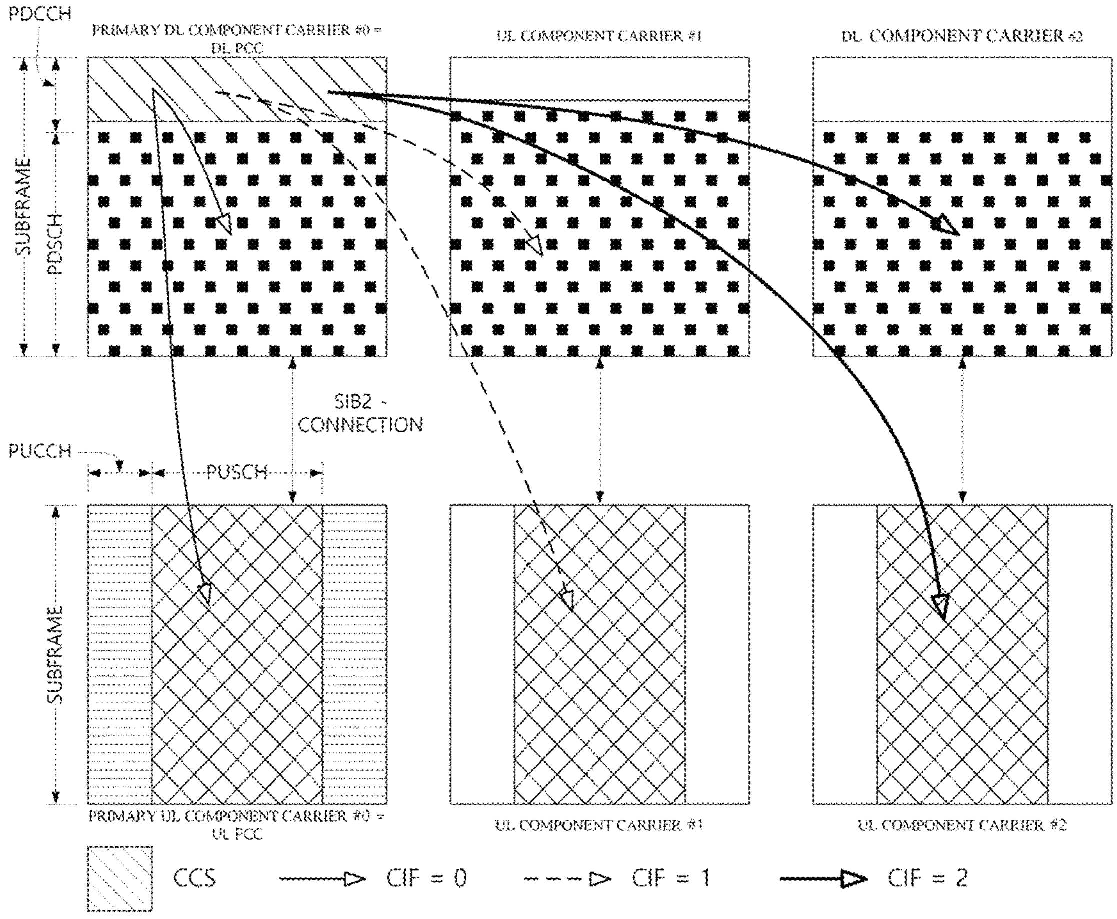
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
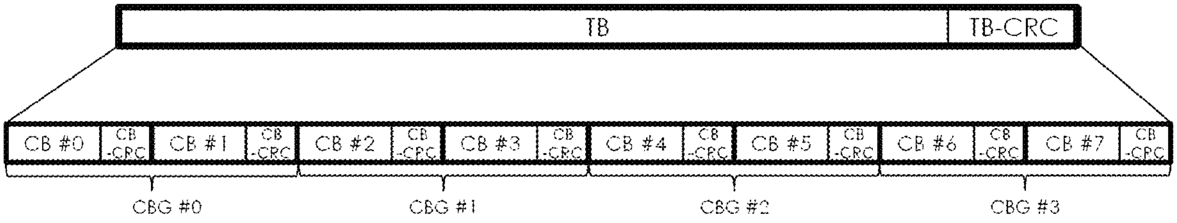
FIG. 11 illustrates a code block group (CBG) configuration and time-frequency resource mapping thereof according to an embodiment of the present disclosure.
Figure 11:
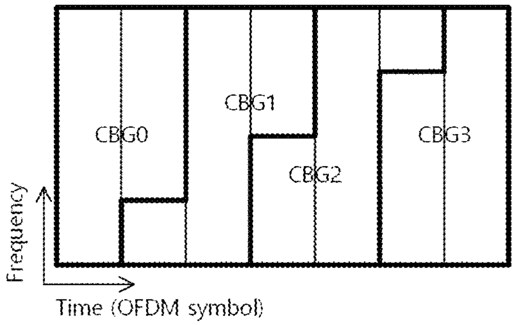

FIG. 11 illustrates a code block group (CBG) configuration and time-frequency resource mapping thereof according to an embodiment of the present disclosure. More specifically, FIG. 11A illustrates an embodiment of a CBG configuration included in one transport block (TB), and FIG. 11B illustrates time frequency resource mapping of the corresponding CBG configuration.

A maximum supported length of a channel code is defined. For example, the maximum supported length of a turbo code used in 3GPP LTE(-A) is 6144 bits. However, the length of a transport block (TB) transmitted in a PDSCH may be longer than 6144 bits. If the length of the TB is longer than the maximum supported length, the TB may be divided into code blocks (CBs) having a length up to 6144 bits. Each CB is a unit in which channel coding is performed. In addition, several CBs may be bundled to form one CBG for efficient retransmission. A terminal and a base station need information on a configuration of the CBG.

CBGs and CBs in a TB may be configured according to various embodiments. According to an embodiment, the number of usable CBGs may be determined as a fixed value, or may be configured by RRC configuration information between the base station and the terminal. In this case, the number of CBs is determined according to the length of the TB, and the CBGs may be configured according to the determined number information. According to another embodiment, the number of CBs that may be included in one CBG may be determined as a fixed value, or may be configured by RRC configuration information between the base station and the terminal. In this case, when the number of CBs is determined according to the length of the TB, the number of CBGs may be configured according to information on the number of CBs per one CBG.

Referring to an embodiment of FIG. 11A, one TB may be divided into eight CBs. The eight CBs may be grouped into four CBGs again. The mapping relationship (or CBG configuration) of the CB and the CBG may be configured statically between the base station and the terminal or semi-statically with the RRC configuration information. According to another embodiment, the mapping relationship may be configured through dynamic signaling. When the terminal receives a PDCCH transmitted by the base station, the terminal may directly or indirectly identify the CB and CBG mapping relationship (or CBG configuration) through explicit information and/or implicit information. One CBG may include only one CB or may include all CBs constituting one TB. For reference, the techniques proposed in the embodiments of the present disclosure may be applied regardless of CB and CBG configuration.

Referring to FIG. 11B, CBGs constituting one TB are mapped to time-frequency resources for which a PDSCH is scheduled. According to an embodiment, each of the CBGs may be allocated to the frequency axis first and then extended to the time axis. When a PDSCH including one TB including four CBGs is allocated to seven OFDM symbols, CBG0 may be transmitted through the first and second OFDM symbols, CBG1 may be transmitted through the second, third, and fourth OFDM symbols, CBG2 may be transmitted through the fourth, fifth, and sixth OFDM symbols, and CBG3 may be transmitted through the sixth and seventh OFDM symbols. The time-frequency mapping relationship allocated to the CBG and the PDSCH may be predetermined between the base station and the terminal. However, the mapping relationship shown in FIG. 11B is an embodiment for explaining the present disclosure, and the technique proposed in the embodiment of the present disclosure may be applied regardless of the time-frequency mapping relationship of the CBG.

Figure 12:
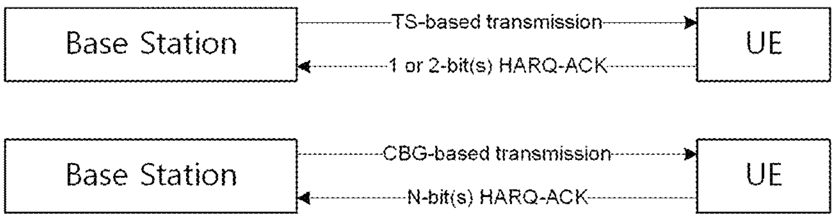
FIG. 12 illustrates a process in which a base station performs TB-based transmission or CBG-based transmission, and a terminal performs HARQ-ACK transmission in response thereto according to an embodiment of the present disclosure.

FIG. 12 illustrates a process in which a base station performs TB-based transmission or CBG-based transmission, and a terminal performs HARQ-ACK transmission in response thereto according to an embodiment of the present disclosure. Referring to FIG. 12, the base station may configure a transmission scheme suitable for a terminal between TB-based transmission and CBG-based transmission. The terminal may transmit the HARQ-ACK information bit(s) according to the transmission scheme configured by the base station, through a PUCCH or a PUSCH. The base station may configure the PDCCH to schedule a PDSCH to be transmitted to the terminal. The PDCCH may schedule TB-based transmission and/or CBG-based transmission. For example, one TB or two TBs may be scheduled in the PDCCH. If one TB is scheduled, the terminal should feedback 1-bit HARQ-ACK. If two TBs are scheduled, the terminal should feedback 2-bit HARQ-ACK for each of two TBs. In order to eliminate ambiguity between the base station and the terminal, a predetermined sequence may exist between each information bit of the 2-bit HARQ-ACK and two TBs. For reference, when a MIMO transmission rank or layer is low, one TB may be transmitted in one PDSCH, and when the MIMO transmission rank or layer is high, two TBs may be transmitted in one PDSCH.

The terminal may transmit 1-bit TB-based HARQ-ACK per one TB to inform the base station of whether reception of each TB has been successfully performed. In order to generate the HARQ-ACK for one TB, the terminal may check where there is a reception error of the corresponding TB through TB-CRC. If the TB-CRC for the TB is successfully checked, the terminal generates an ACK for HARQ-ACK of the corresponding TB. However, if a TB-CRC error occurs for the TB, the terminal generates NACK for HARQ-ACK of the corresponding TB. The terminal transmits the TB-based HARQ-ACK(s) generated as described above to the base station. The base station retransmits the TB for which the NACK is responded among the TB-based HARQ-ACK(s) received from the terminal.

In addition, the terminal may transmit a 1-bit CBG-based HARQ-ACK per one CBG to inform the base station of whether the reception of each CBG has been successfully performed. In order to generate HARQ-ACK for one CBG, the terminal may decode all CBs included in the CBG and check the reception error of each CB through the CB-CRC. If the terminal successfully receives all CBs constituting one CBG (that is, when all CB-CRCs are successfully checked), the terminal generates an ACK for HARQ-ACK of the corresponding CBG. However, if the terminal does not successfully receive at least one of the CBs constituting one CBG (that is, when at least one CB-CRC error occurs), the terminal generates a NACK for HARQ-ACK of the corresponding CBG. The terminal transmits the CBG-based HARQ-ACK(s) generated as described above to the base station. The base station retransmits the CBG for which the NACK is responded among the CBG-based HARQ-ACK(s) received from the terminal. According to an embodiment, the CB configuration of the retransmitted CBG may be the same as the CB configuration of the previously transmitted CBG. The length of the CBG-based HARQ-ACK bit(s) transmitted by the terminal to the base station may be determined on the basis of the number of CBGs transmitted through the PDSCH or the maximum number of CBGs configured by an RRC signal.

Even when the terminal successfully receives all the CBGs included in the TB, a TB-CRC error for the TB may occur. In this case, the terminal may perform flipping of the CBG-based HARQ-ACK in order to request retransmission for the corresponding TB. That is, even though all CBGs included in the TB are successfully received, the terminal may generate all of the CBG-based HARQ-ACK information bits as NACKs. Upon receiving the CBG-based HARQ-ACK feedback in which all HARQ-ACK information bits are NACKs, the base station retransmits all CBGs of the corresponding TB.

According to an embodiment of the present disclosure, CBG-based HARQ-ACK feedback may be used for successful transmission of a TB. The base station may indicate the terminal to transmit the CBG-based HARQ-ACK. In this case, a retransmission scheme according to the CBG-based HARQ-ACK may be used. The CBG-based HARQ-ACK may be transmitted through a PUCCH. In addition, when UCI is configured to be transmitted through the PUSCH, the CBG-based HARQ-ACK may be transmitted through the corresponding PUSCH. The configuration of the HARQ- ACK resource in the PUCCH may be configured through an RRC signal. In addition, the actually transmitted HARQ-ACK resource may be indicated through the PDCCH scheduling the PDSCH transmitted on the basis of the CBG. The terminal may transmit HARQ-ACK(s) for successful reception of transmitted CBGs through one PUCCH resource indicated through PDCCH among PUCCH resources configured with the RRC.

The base station may identify whether the terminal has successfully received the CBG(s) transmitted to the terminal through the CBG-based HARQ-ACK feedback of the terminal. That is, through the HARQ-ACK for each CBG received from the terminal, the base station may identify the CBG(s) that the terminal has successfully received and the CBG(s) that the terminal has failed to receive. The base station may perform CBG retransmission on the basis of the received CBG-based HARQ-ACK. More specifically, the base station may bundle and retransmit only the CBG(s) for which HARQ-ACK of a reception failure is responded in one TB. In this case, the CBG(s) for which the HARQ-ACK of successful reception has been responded are excluded from retransmission. The base station may schedule the retransmitted CBG(s) to one PDSCH and transmit the same to the terminal.

<Commutation Method in Unlicensed Band>

Figure 13:
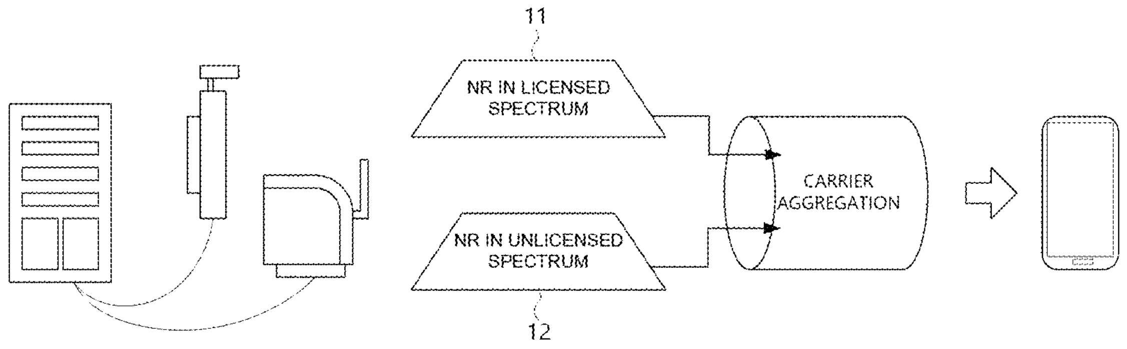
FIG. 13 illustrates an NR-unlicensed (NR-U) service environment.

FIG. 13 illustrates an NR-unlicensed (NR-U) service environment.

Referring to FIG. 13, a service environment in which an NR technology (11) in a licensed band and NR-U corresponding to an NR technology (12) in an unlicensed band are combined may be provided to a user. For example, the NR technology (11) in the licensed band and the NR technology (12) in the unlicensed band in the NR-U environment may be integrated by using a technology such as carrier aggregation, or the like, which may contribute to extension of a network capacity. In addition, in an asymmetric traffic structure in which the amount of downlink data is greater than that of uplink data, the NR-U may provide an optimized NR service according to various requirements or environments. For convenience, the NR technology in the licensed band is referred to as NR-licensed (NR-L) and the NR technology in the unlicensed band is referred to as NR-unlicensed (NR-U).

Figure 14:
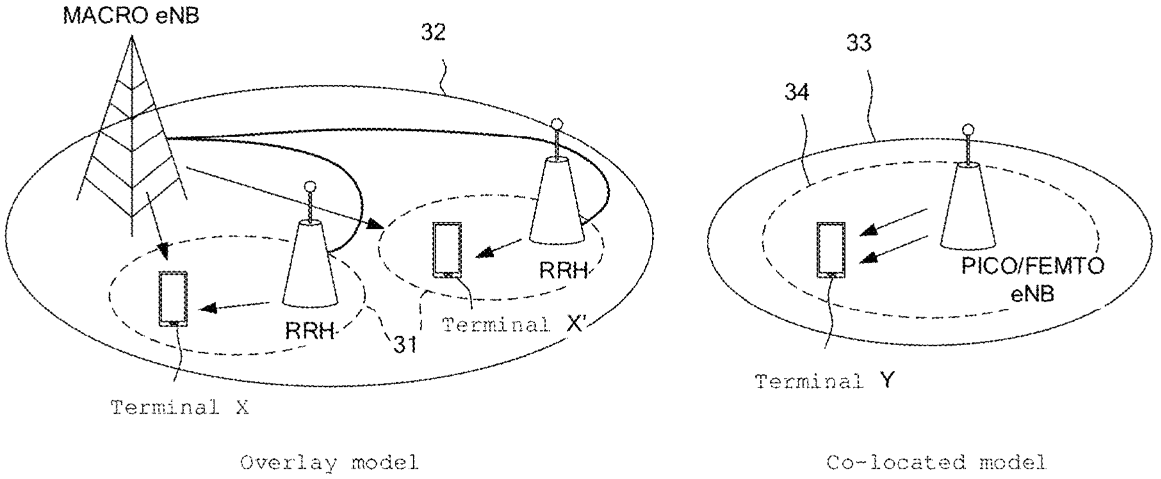
FIG. 14 illustrates a layout scenario of a terminal and a base station in an NR-U service environment.

FIG. 14 illustrates a layout scenario of a terminal and a base station in an NR-U service environment. A frequency band targeted by the NR-U service environment does not have a long wireless communication arrival distance due to the high-frequency characteristics. Considering this, the placement scenario for a terminal and a base station in an environment in which a conventional NR-L service and the NR-U service coexist may be an overlay model or a co-located model.

In the overlay model, a macro base station may perform wireless communication with terminal X and terminal X' in a macro region 32 by using a licensed band carrier, and may be connected to multiple ratio remote heads (RRHs) through an X2 interface. Each of the RRHs may perform wireless communication with terminal X or terminal X' in a predetermined region 31 by using an unlicensed band carrier. The macro base station and the RRHs have different frequency bands, and thus there is no interference therebetween, however, the macro base station and the RRHs are required to perform fast data exchange therebetween through the X2 interface so as to use an NR-U service through carrier aggregation as an auxiliary downlink channel of an NR-L service.

In the co-located model, a pico/femto base station may perform wireless communication with terminal Y by simultaneously using a licensed band carrier and an unlicensed band carrier. However, the pico/femto base station may use an NR-L service and an NR-U service together only when downlink transmission is performed. The coverage 33 of the NR-L service and the coverage 34 of the NR-U service may be different according to a frequency band, transmission power, and the like.

When NR communication is performed in an unlicensed band, existing apparatuses (e.g. wireless LAN (Wi-Fi) apparatus) that communicate in the unlicensed band are unable to demodulate an NR-U message or data. Therefore, the existing apparatuses may determine an NR-U message or data to be a kind of energy, and then perform an interference avoidance operation by an energy detection technique. That is, if an energy corresponding to an NR-U message or data is smaller than −62 dBm or a particular energy detection (ED) threshold, wireless LAN apparatuses may communicate while neglecting the message or data. Accordingly, a terminal that performs NR communication in an unlicensed band may be frequently disturbed by the wireless LAN apparatuses.

Therefore, in order to effectively implement an NR-U technology/service, it is required to allocate or reserve a particular frequency band during a particular time interval. However, peripheral apparatuses that communicate through an unlicensed band make an attempt to access on the basis of an energy detection technique, and thus it is difficult to efficiently provide an NR-U service. Therefore, in order to install an NR-U technology, a study on a method for coexisting with an existing unlicensed band apparatus, and a method for efficiently sharing a wireless channel is required to precede. That is, a strong coexistence mechanism by which an NR-U apparatus does not affect an existing unlicensed band apparatus is required to be developed.

Figure 15:
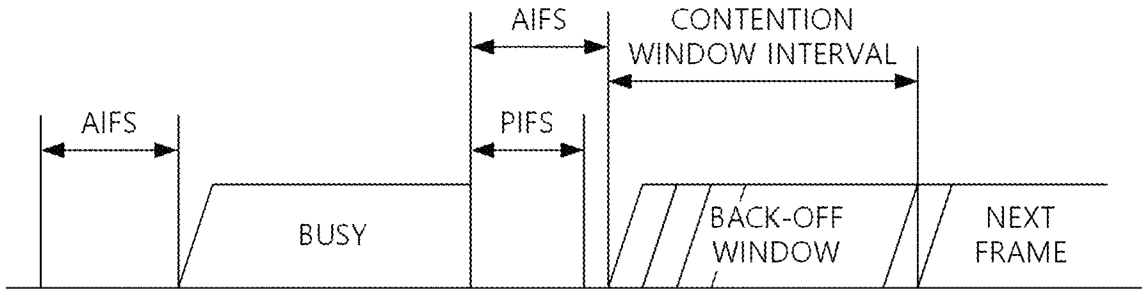
FIG. 15 illustrates a communication scheme (e.g., wireless LAN) operating in a conventional unlicensed band.

FIG. 15 illustrates an example of a conventional communication scheme (e.g. wireless LAN) operated in an unlicensed band. An apparatus that operates in an unlicensed band is operated on the basis of listen-before talk (LBT) most of the time, and thus performs a clear channel assessment (CCA) of sensing a channel before transmitting data.

Referring to FIG. 15, before transmitting data, a wireless LAN apparatus (e.g. an AP or an STA) performs carrier sensing to check whether a channel is being used (is busy). When a wireless signal having a predetermined strength or higher is sensed in a channel in which the data is to be transmitted, the wireless LAN apparatus determines that the channel is busy, and delays an access to the channel. This process is called a clear channel assessment, and a signal level for determining whether a signal is sensed is called a CCA threshold. Meanwhile, when a wireless signal is not sensed in the channel, or a wireless signal having a strength smaller than the CCA threshold is sensed, the apparatus determines that the channel is in an idle state.

When the channel is determined to be in an idle state, a terminal having data to transmit performs a backoff procedure after a defer duration (e.g. an arbitration interframe space (AIFS), a PCF IFS (PCIFS), etc.). The defer period implies a minimum time interval during which a terminal is required to wait after the channel has entered the idle state. The backoff procedure allows the terminal to wait more during a predetermined time interval after the defer period. For example, while the channel is in the idle state, the terminal may wait while reducing a slot time interval by a random number assigned to the terminal in a contention window (CW), and after all the slot time is exhausted, the terminal may attempt to access the channel.

When the channel is successfully accessed, the terminal may transmit data through the channel. When data transmission is successful, the CW size (CWS) is reset to an initial value (CWmin). Meanwhile, when data transmission fails, the CWS is doubled. Accordingly, the terminal receives a new random number assigned within the range of two times of the previous random number range, and then performs a backoff procedure in the next CW. In a wireless LAN, only an ACK is defined as reception response information for data transmission. Therefore, when an ACK is received for data transmission, the CWS is reset to the initial value, and when feedback information for data transmission is not received, the CWS is doubled.

As described above, since most communication in the conventional unlicensed band operates on the basis of the LBT, channel access in the NR-U system also performs the LBT for coexistence with the conventional device. In detail, in the NR, the channel access method on the unlicensed band may be divided into four categories below according to whether there is LBT/an application scheme of the LBT.

Category 1: No LBT

A Tx entity does not perform an LBT procedure.

Category 2: LBT without Random Backoff

The Tx entity senses whether a channel is in an idle state during a time interval without random backoff to perform transmission. That is, as soon as it is sensed that the channel is in the idle state for a first interval, the Tx entity may perform transmission through the corresponding channel. The first interval corresponds to an interval of a pre-configured duration immediately before the Tx entity performs transmission. According to an embodiment, the first interval corresponds to an interval having a 25 μs duration, but the present disclosure is not limited thereto.

Category 3: LBT Performing Random Backoff by Using CW Having Fixed Size

The Tx entity obtains a random number within a CW having a fixed size, configures the obtained number as an initial value of a backoff counter (or backoff timer) N, and performs backoff by using the configured backoff counter N. That is, in the backoff procedure, the Tx entity decreases the backoff counter by 1 whenever it is sensed that the channel is in the idle state for a predetermined slot period. Here, the predetermined slot period may be 9 μs, but the present disclosure is not limited thereto. The backoff counter N is decreased by 1 from the initial value, and when the value of the backoff counter N reaches 0, the Tx entity may perform transmission. In order to perform backoff, the Tx entity first senses whether the channel is in the idle state during a second interval (that is, a defer duration (period) $T_d$). According to an embodiment of the present disclosure, the Tx entity may sense (or determine) whether the channel is in the idle state during the second interval, according to whether the channel is in the idle state for at least some period (e.g., one slot period) within the second interval. The second interval may be configured on the basis of a channel access priority class of the Tx entity, and includes a period of 16 μs and m consecutive slot periods. Here, m is a value configured according to the channel access priority class. The Tx entity performs channel sensing to decrease the backoff counter when it is sensed that the channel is in the idle state during the second interval. When it is sensed that the channel is in an occupied state during the backoff procedure, the backoff procedure is stopped. After stopping the backoff procedure, the Tx entity may resume backoff when it is sensed that the channel is in the idle state for an additional second interval. Accordingly, the Tx entity may perform transmission when the channel is idle during the slot period of the backoff counter N, in addition to the second interval. In this case, the initial value of the backoff counter N is obtained within the CW having the fixed size.

Category 4: LBT Performing Random Backoff by Using CW Having Variable Size

The Tx entity obtains a random number within a CW having a variable size, configures the number as an initial value of a backoff counter (or backoff timer) N, and performs backoff by using the configured backoff counter N. More specifically, the Tx entity may adjust the size of the CW on the basis of HARQ-ACK information for the previous transmission, and the initial value of the backoff counter N is obtained within the CW having the adjusted size. A specific process of performing backoff by the Tx entity is as described in Category 3. The Tx entity may perform transmission when the channel is idle during the slot period of the backoff counter N, in addition to the second interval. In this case, the initial value of the backoff counter N is obtained within the CW having the variable size.

In the above-described Category 1 to Category 4, the Tx entity may be a base station or a terminal. According to an embodiment of the present disclosure, a first type channel access may refer to a Category 4 channel access, and a second type channel access may refer to a Category 2 channel access.

Figure 16:
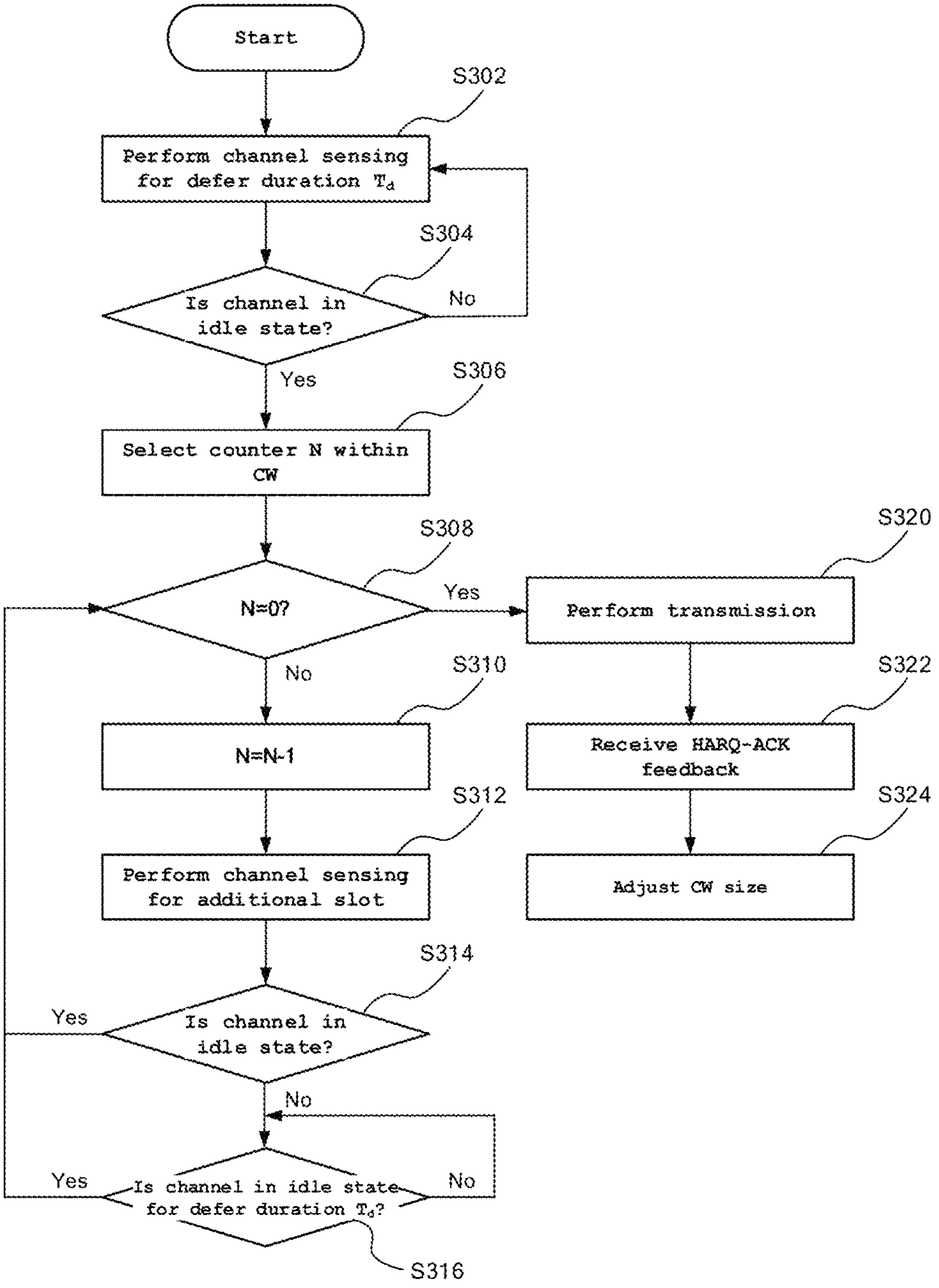
FIG. 16 illustrates a channel access procedure based on Category 4 LBT according to an embodiment of the present disclosure.

FIG. 16 illustrates a channel access procedure based on Category 4 LBT according to an embodiment of the present disclosure.

In order to perform the channel access, first, the Tx entity performs channel sensing for the defer duration $T_d$ (operation S302). According to an embodiment of the present disclosure, the channel sensing for a defer duration $T_d$ in operation S302 may be performed through channel sensing for at least a part of the defer duration $T_d$. For example, the channel sensing for the defer duration $T_d$ may be performed through the channel sensing during one slot period within the defer duration $T_d$. The Tx entity identify whether the channel is in an idle state through the channel sensing for the defer duration $T_d$ (operation S304). If it is sensed that the channel is in the idle state for the defer duration $T_d$, the Tx entity proceeds to operation S306. If it is not sensed that the channel is in the idle state (that is, when it is sensed that the channel is in an occupied state) for the defer duration $T_d$, the Tx entity returns to operation S302. The Tx entity repeats operations S302 to S304 until it is sensed that the channel is in the idle state for the defer duration $T_d$. The defer duration $T_d$ may be configured on the basis of a channel access priority class of the Tx entity, and includes a period of 16 μs and m consecutive slot periods. Here, m is a value configured according to the channel access priority class.

Next, the Tx entity obtains a random number within a predetermined CW, configures the number as an initial value of the backoff counter (or backoff timer) N (operation S306), and proceeds to operation S308. The initial value of the backoff counter N is randomly selected from values between 0 and a CW. The Tx entity performs the backoff procedure by using the configured backoff counter N. That is, the Tx entity performs the backoff procedure by repeating operations S308 to S316 until the value of the backoff counter N reaches 0. FIG. 16 illustrates that operation S306 is performed after it is sensed that the channel is in the idle state for the defer duration $T_d$, but the present disclosure is not limited thereto. That is, operation S306 may be performed independently from operations S302 to S304, and may be performed prior to operations S302 to S304. In a case in which operation S306 is performed prior to operations S302 to S304, if it is sensed that the channel is in the idle state for the defer duration $T_d$ by operations S302 to S304, the Tx entity proceeds to operation S308.

In operation S308, the Tx entity checks whether the value of the backoff counter N is 0. If the value of the backoff counter N is 0, the Tx entity proceeds to operation S320 to perform transmission. If the value of the backoff counter N is not 0, the Tx entity proceeds to operation S310. In operation S310, the Tx entity decreases the value of the backoff counter N by 1. According to an embodiment, the Tx entity may selectively decrease the value of the backoff counter by 1 in the channel sensing process for each slot. In this case, operation S310 may be skipped at least once by the selection of the Tx entity. Next, the Tx entity performs channel sensing for an additional slot period (operation S312). The Tx entity identifies whether the channel is in the idle state through the channel sensing for the additional slot period (operation S314). If it is sensed that the channel is in the idle state for the additional slot period, the Tx entity returns to operation S308. Accordingly, the Tx entity may decrease the backoff counter by 1 whenever it is sensed that the channel is in the idle state for a predetermined slot period. Here, the predetermined slot period may be 9 μs, but the present disclosure is not limited thereto.

In operation S314, if it is not sensed that the channel is in the idle state (that is, when it is sensed that the channel is in an occupied state) for the additional slot period, the Tx entity proceeds to operation S316. In operation S316, the Tx entity identifies whether the channel is in the idle state for the additional defer duration $T_d$. According to an embodiment of the present disclosure, the channel sensing in operation S316 may be performed in units of slots. That is, the Tx entity identifies whether it is sensed that channel is in the idle state during all slot periods of the additional defer duration $T_d$. When a slot in the occupied state is detected within the additional defer duration $T_d$, the Tx entity immediately restarts operation S316. Then it is sensed that the channel is in the idle state during all slot periods of the additional defer duration $T_d$, the Tx entity returns to operation S308.

If it is identified in operation S308 that the value of the backoff counter N is 0, the Tx entity performs transmission (operation S320). The Tx entity receives HARQ-ACK feedback corresponding to the transmission (operation S322). The Tx entity may identify whether the previous transmission is successful through the received HARQ-ACK feedback. Next, the Tx entity adjusts the size of a CW for the next transmission on the basis of the received HARQ-ACK feedback (operation S324).

As described above, after it is sensed that the channel is in the idle state for the defer duration $T_d$, the Tx entity may perform the transmission when the channel is idle for N additional slot periods. As described above, the Tx entity may be a base station or a terminal, and the channel access procedure of FIG. 16 may be used for downlink transmission of the base station and/or uplink transmission of the terminal.

Hereinafter, a method for adaptively adjusting a CWS when accessing a channel in an unlicensed band is proposed. The CWS may be adjusted on the basis of user equipment (UE) feedback, and UE feedback used for CWS adjustment may include the HARQ-ACK feedback and CQI/PMI/RI. In the present disclosure, a method for adaptively adjusting a CWS on the basis of the HARQ-ACK feedback is proposed. The HARQ-ACK feedback includes at least one of ACK, NACK, DTX, and NACK/DTX.

As described above, the CWS is adjusted on the basis of ACK even in a wireless LAN system. When the ACK feedback is received, the CWS is reset to the minimum value (CWmin), and when the ACK feedback is not received, the CWS is increased. However, in a cellular system, a CWS adjustment method in consideration of multiple access is required.

First, for the description of the present disclosure, terms are defined as follows.

Set of HARQ-ACK feedback values (i.e., HARQ-ACK feedback set): This refers to HARQ-ACK feedback value(s) used for CWS update/adjustment. The HARQ-ACK feedback set is decoded at a time when the CWS is determined and corresponds to available HARQ-ACK feedback values. The HARQ-ACK feedback set includes HARQ-ACK feedback value(s) for one or more DL (channel) transmissions (e.g., PDSCHs) on an unlicensed band carrier (e.g., an Scell or an NR-U cell). The HARQ-ACK feedback set may include HARQ-ACK feedback value(s) for a DL (channel) transmission (e.g., PDSCH), for example, multiple HARQ-ACK feedback values fed back from multiple terminals. The HARQ-ACK feedback value may indicate reception response information for the code block group (CBG) or the transport block (TB), and may indicate any one of ACK, NACK, DTX, or NACK/DTX. Depending on the context, the HARQ-ACK feedback value may be mixed with terms such as a HARQ-ACK value, a HARQ-ACK information bit, and a HARQ-ACK response.

Reference window: This refers to a time interval in which a DL transmission (e.g., PDSCH) corresponding to the HARQ-ACK feedback set is performed in an unlicensed band carrier (e.g., an Scell or an NR-U cell). A reference window may be defined in units of slots or subframes according to embodiments. The reference window may indicate one or more specific slots (or subframes). According to an embodiment of the present disclosure, the specific slot (or reference slot) may include a start slot of the most recent DL transmission burst in which at least part of HARQ-ACK feedback is expected to be available.

Figure 17:
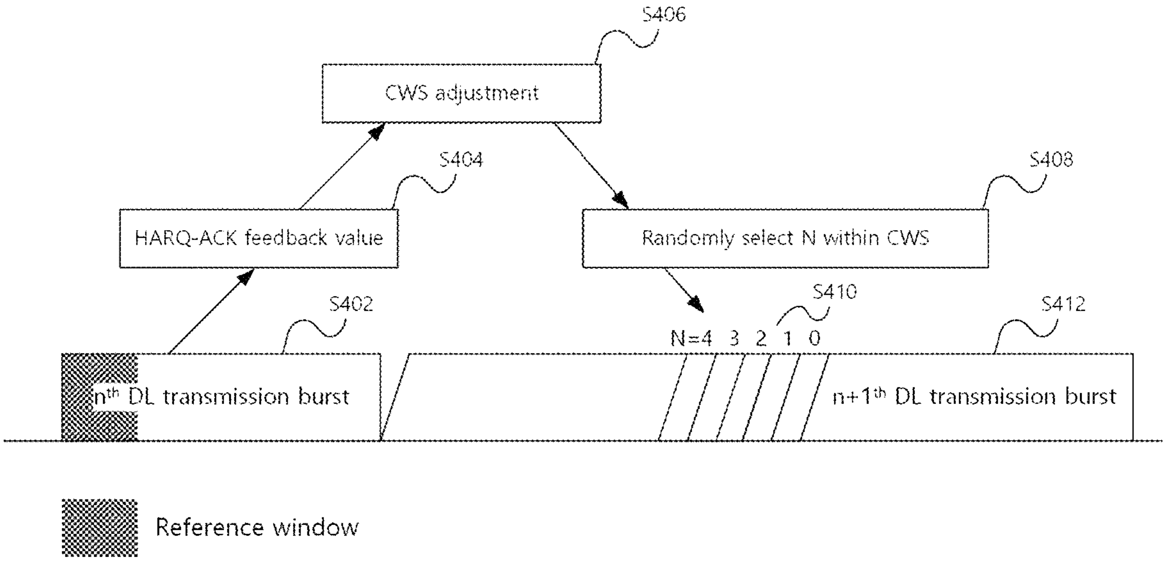
FIG. 17 illustrates an embodiment of a method for adjusting a contention window size (CWS) on the basis of HARQ-ACK feedback.

FIG. 17 illustrates an embodiment of a method for adjusting a contention window size (CWS) on the basis of HARQ-ACK feedback. In the embodiment of FIG. 17, a Tx entity may be a base station and an Rx entity may be a terminal, but the present disclosure is not limited thereto. In addition, although the embodiment of FIG. 17 assumes a channel access procedure for the DL transmission by the base station, at least some configurations may be applied to a channel access procedure for the UL transmission by the terminal.

Referring to FIG. 17, the Tx entity transmits the n-th DL transmission burst in an unlicensed band carrier (e.g., an Scell or an NR-U cell) (operation S402), and then if an additional DL transmission is required, the Tx entity may transmit the (n+1)-th DL transmission burst on the basis of LBT channel access (operation S412). Here, the transmission burst indicates a transmission through one or more adjacent slots (or subframes). FIG. 17 illustrates a channel access procedure and a CWS adjustment method on the basis of the above-described first type channel access (that is, Category 4 channel access).

First, the Tx entity receives HARQ-ACK feedback corresponding to the PDSCH transmission(s) in an unlicensed band carrier (e.g., an Scell or an NR-U cell) (operation S404). The HARQ-ACK feedback used for CWS adjustment includes HARQ-ACK feedback corresponding to the most recent DL transmission burst (that is, the n-th DL transmission burst) in the unlicensed band carrier. More specifically, the HARQ-ACK feedback used for CWS adjustment includes HARQ-ACK feedback corresponding to PDSCH transmission on the reference window within the most recent DL transmission burst. The reference window may indicate one or more specific slots (or subframes). According to an embodiment of the present disclosure, the specific slot (or reference slot) includes a start slot of the most recent DL transmission burst in which at least part of HARQ-ACK feedback is expected to be available.

When the HARQ-ACK feedback is received, an HARQ-ACK value is obtained for each transport block (TB). The HARQ-ACK feedback includes at least one of a TB-based HARQ-ACK bit sequence and a CBG-based HARQ-ACK bit sequence. When the HARQ-ACK feedback is the TB-based HARQ-ACK bit sequence, one HARQ-ACK information bit is obtained per TB. On the other hand, when the HARQ-ACK feedback is the CBG-based HARQ-ACK bit sequence, N HARQ-ACK information bit(s) are obtained per TB. Here, N is the maximum number of CBGs per TB configured for the Rx entity of the PDSCH transmission. According to an embodiment of the present disclosure, HARQ-ACK value(s) for each TB may be determined according to the HARQ-ACK information bit(s) for each TB of the HARQ-ACK feedback for CWS determination. More specifically, when the HARQ-ACK feedback is the TB-based HARQ-ACK bit sequence, one HARQ-ACK information bit of the corresponding TB is determined as an HARQ-ACK value. However, when the HARQ-ACK feedback is the CBG-based HARQ-ACK bit sequence, one HARQ-ACK value may be determined on the basis of N HARQ-ACK information bit(s) corresponding to CBGs included in the corresponding TB.

Next, the Tx entity adjusts the CWS on the basis of the HARQ-ACK values determined in operation S404 (operation S406). That is, the Tx entity determines the CWS on the basis of the HARQ-ACK value(s) determined according to the HARQ-ACK information bit(s) for each TB of the HARQ-ACK feedback. More specifically, the CWS may be adjusted on the basis of a ratio of NACKs among HARQ-ACK value(s). First, parameters may be defined as follows.

p: Priority class value

CW_min_p: Predetermined minimum CWS value of priority class p

CW_max_p: Predetermined maximum CWS value of priority class p

CW_p: CWS for transmission of priority class p. CW_p is configured as any one of multiple CWS values between CW_min_p and CW_max_p included in the allowed CWS set of the priority class p.

According to an embodiment of the present disclosure, the CWS may be determined according to the following stages.

Stage A-1) For every priority class p, CW_p is configured as CW_min_p. In this case, the priority class p includes {1, 2, 3, 4}.

Stage A-2) When the ratio of NACKs to HARQ-ACK values for the PDSCH transmission(s) of the reference window k is Z % or higher, CW_p is increased to the next highest allowed value for every priority class p (in addition, stage A-2 remains). Otherwise, stage A proceeds to stage A-1. Here, Z is a predetermined integer in the range of 0<=Z<=100, and according to an embodiment, Z may be configured as one of {30, 50, 70, 80, 100}.

Here, the reference window k includes the start slot (or subframe) of the most recent transmission by the Tx entity. In addition, the reference window k is a slot (or subframe) in which at least part of the HARQ-ACK feedback is expected to be available. If CW_p=CW_max_p, the next highest allowed value for CW_p adjustment is CW_max_p.

Next, the Tx entity selects a random number within the CWS determined in operation S406 and configures the number as an initial value of the backoff counter N (operation S408). The Tx entity performs backoff by using the configured backoff counter N (operation S410). That is, the Tx entity may decrease the backoff counter by 1 for each slot period in which it is sensed that the channel is in the idle state. When the value of the backoff counter reaches 0, the Tx entity may transmit the (n+1)-th DL transmission burst in the corresponding channel (operation S412).

In the above-described CWS adjustment process, determination has to be made as to whether not only ACK and NACK but also DTX or NACK/DTX are considered together among the HARQ-ACK feedback. According to an embodiment of the present disclosure, depending on whether the transmission in the unlicensed band is on the basis of self-carrier scheduling or cross-carrier scheduling, determination may be made as to whether DTX or NACK/DTX is considered together in the CWS adjustment process.

In self-carrier scheduling, a DL transmission (e.g., PDSCH) on the unlicensed band carrier is scheduled through a control channel (e.g., (E)PDCCH) transmitted on the same unlicensed band carrier. Here, since DTX indicates a failure in the DL transmission by a hidden node or the like in the unlicensed band carrier, the DTX may be used for CWS adjustment together with NACK. In addition, the DTX is one of the methods in which the terminal informs the base station of a failure in decoding the control channel by the terminal even though the base station has transmitted, to the terminal, the control channel including scheduling information (e.g., (E)PDCCH). The DTX may be determined only by the HARQ-ACK feedback value, or may be determined in consideration of the HARQ-ACK feedback value and the actual scheduling situation. According to an embodiment of the present disclosure, DTX and NACK/DTX may be counted as a NACK for CWS adjustment in the self-carrier scheduling situation. That is, when the ratio of a sum of NACK, DTX, and NACK/DTX to HARQ-ACK values for the PDSCH transmission(s) of the reference window k is equal to or higher than Z %, the CWS is increased to the next highest allowed value. Otherwise, the CWS is reset to the minimum value.

In cross-carrier scheduling, a DL transmission (e.g., PDSCH) on the unlicensed band carrier may be scheduled through a control channel (e.g., (E)PDCCH) transmitted on the licensed band carrier. In this case, since the DTX feedback is used to determine a decoding situation of the terminal for the control channel transmitted on the licensed band carrier, the DTX feedback is not helpful to adaptively adjust the CWS for a channel access in the unlicensed band. Therefore, according to an embodiment of the present disclosure, the DTX may be ignored for CWS determination in the cross-carrier scheduling situation from the licensed band. That is, for CWS adjustment, among HARQ-ACK value(s), only ACK and NACK may be considered for calculating the ratio of NACKs, or only ACK, NACK and NACK/DTX may be considered for calculating the ratio of NACKs. Therefore, when calculating the ratio of the NACKs, the DTX may be excluded.

Figure 18:
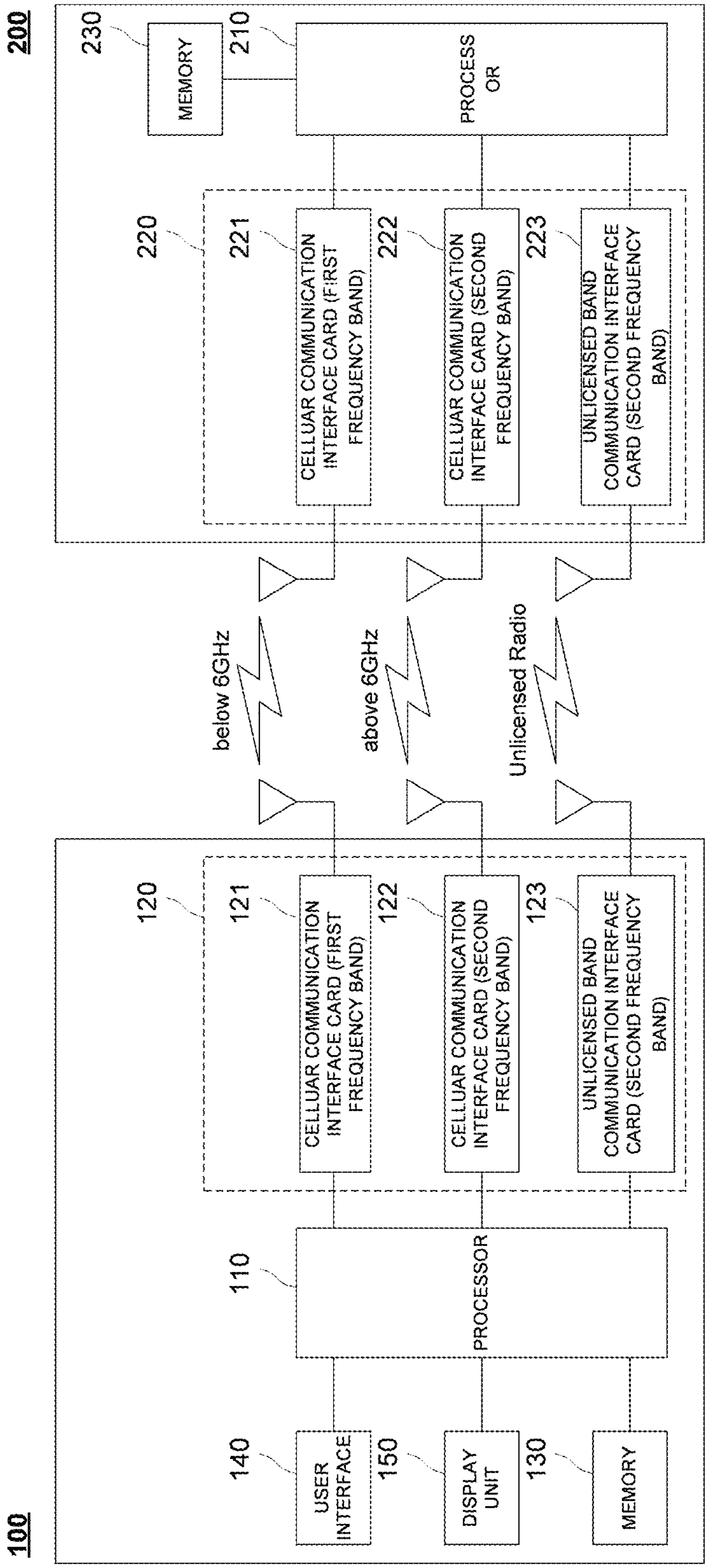
FIG. 18 illustrates a configuration of each of a terminal and a base station according to an embodiment of the present disclosure.

FIG. 18 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card may be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, 52.6 GHz or more band. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card may be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210.

The unlicensed band communication interface card 223 may include at least one NIC module using an unlicensed band. For example, the unlicensed band may be a band of 2.4 GHz, 5 GHz, 6 GHz, 7 GHz, 52.6 GHz or more band. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 18 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Described is a channel access method which may be used by a wireless communication apparatus when multiple carriers are used in the conventional LTE AAA. Specifically, the carriers may be RF chains or links used for transmission or reception using different frequency channel bandwidths within the same frequency band, and may also be RF chains or links used for transmission or reception in different frequency bands. In addition, the wireless communication apparatus may include at least one of a base station, a terminal, a station, and an access point. The channel access method used by the wireless communication apparatus when multiple carriers are used in the convention LTE LAA may be divided into Type-A channel access and Type-B channel access. First, a channel access method corresponding to the Type-A channel access is described.

When the Type-A channel access is used, the wireless communication apparatus independently performs channel access in each of the multiple carriers. When the wireless communication apparatus has successfully performed channel access in at least one of the multiple carriers, the wireless communication apparatus performs transmission in the carrier in which channel access has been successfully performed. Accordingly, the wireless communication apparatus independently maintains and manages a backoff counter of each of the multiple carriers. Specifically, the wireless communication apparatus maintains and manages a value of a backoff counter corresponding to each of the multiple carriers according to whether each of the multiple carriers is idle or occupied. In addition, the wireless communication apparatus independently maintains and manages a CW of each of the multiple carriers.

The Type-A channel access may be divided into Type-A1 channel access and Type-A2 channel access. The Type-A1 channel access refers to a channel access scheme of independently managing and maintaining a backoff counter of each carrier. In the Type-A1 channel access, when the wireless communication apparatus stops transmission, the wireless communication apparatus may resume an operation of decreasing the backoff counter after sensing that a channel is idle for a predesignated period. In this case, the predesignated period may indicate four sensing slots. In another specific embodiment, a time point after the predesignated period may indicate a time point after the backoff counter is reinitialized. The Type-A2 channel access refers to a channel access scheme of commonly configuring an initial value of a backoff counter corresponding to each of the multiple carriers. The wireless communication apparatus configures a common backoff counter initial value within the largest value among the CW of each of the multiple carriers at the time of attempting channel access. In this case, the wireless communication apparatus independently reduces the backoff counter for each of the multiple carriers. When transmission of at least one of the multiple carriers is stopped, the wireless communication apparatus reinitializes all backoff counters corresponding to each of the multiple carriers.

The Type-B channel access refers to a channel access scheme in which the wireless communication apparatus randomly selects one of multiple carriers and performs the above-described Category 4 LBT in the selected carrier. When the wireless communication apparatus has successfully performed channel access in the selected carrier, the wireless communication apparatus determines whether a carrier remaining after excluding the selected carrier from the multiple carriers is idle during a predesignated duration immediately before transmission. In this case, the wireless communication apparatus performs transmission in the selected carrier and in the carrier that is idle for the predesignated duration immediately before transmission. The predesignated duration may be 25 us. In addition, the wireless communication apparatus selects one of the multiple carriers to prevent a specific carrier from being consecutively selected for one second or longer.

The Type-B channel access is divided into Type-B1 channel access and Type-B2 channel access. In the Type-B1 channel access, even when the wireless communication apparatus attempts to perform transmission through multiple carriers, the wireless communication apparatus maintains and manages only one CW for each priority class (CWp). In the Type-B1 channel access, the wireless communication apparatus manages a value of a CW on the basis of HARQ-ACK received from all of the multiple carriers. That is, the wireless communication apparatus may increase or reset a CW value for each priority class on the basis of the HARQ-ACK received from all of the multiple carriers. In addition, in the Type-B1 channel access, the wireless communication apparatus may increase or reset a CW value for all priority classes on the basis of the HARQ-ACK received from all of the multiple carriers. In the Type-B2 channel access, the wireless communication apparatus independently maintains and manages the CWp of each of the multiple carriers. The Type-B2 channel access refers to a channel access scheme of commonly configuring an initial value of a backoff counter corresponding to each of the multiple carriers. In the Type-B2 channel access, the wireless communication apparatus selects a common backoff counter initial value within the largest value among CWp values maintained in each of the multiple carriers.

Figure 19:
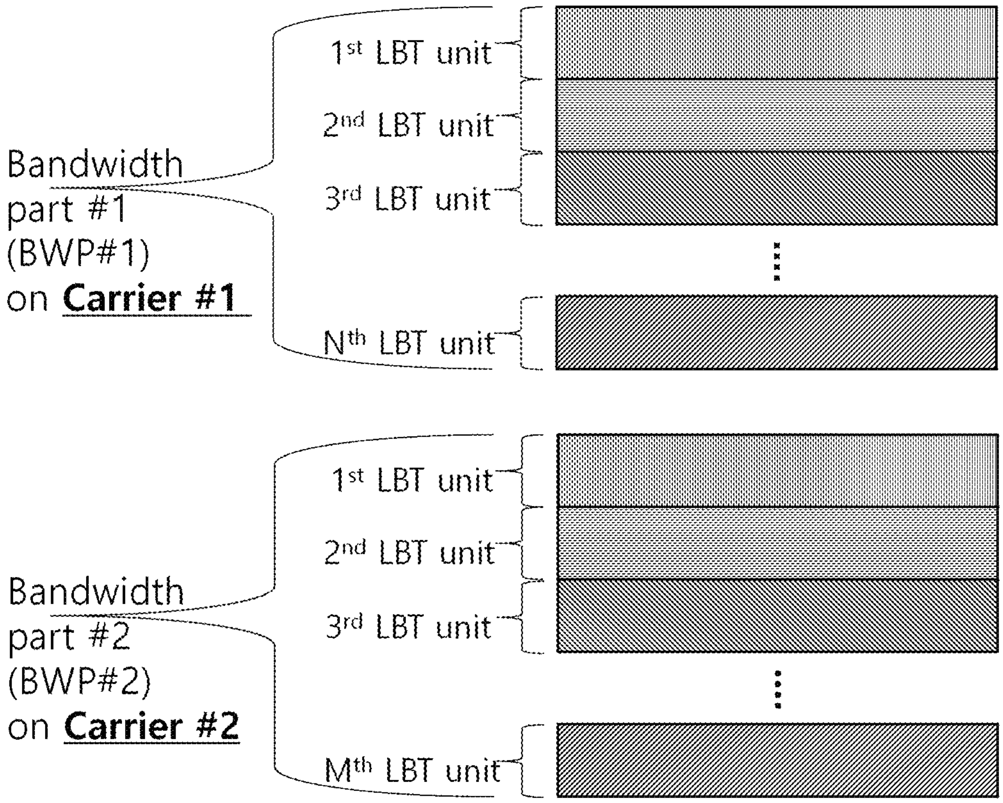
FIG. 19 illustrates a BWP used when multiple carriers are used in an unlicensed band according to an embodiment of the present disclosure.

FIG. 19 illustrates a BWP used when multiple carriers are used in an unlicensed band according to an embodiment of the present disclosure.

In the LTE LAA, one carrier has a 20 MHz bandwidth. In an unlicensed band in the NR system, one carrier may have a bandwidth greater than 20 MHz. One carrier may include one or more BWPs. In addition, the BWP may have a bandwidth equal to or greater than 20 MHz. In an embodiment of FIG. 19, a base station performs downlink transmission using a first carrier (Carrier #1) and a second carrier (Carrier #2). The first carrier includes a first BWP (BWP #1), and the second carrier includes a second BWP (BWP #2). Each of the first BWP (BWP #1) and the second BWP (BWP #2) includes multiple LBT units. In this case, the LBT unit indicates the minimum bandwidth in which the wireless communication apparatus performs LBT. The LBT unit may be referred by as an LBT subband and an LBT channel. In addition, the LBT unit may have a 20 MHz bandwidth. Accordingly, as the bandwidth of each carrier changes and the BWP is used, a new channel access method is required in the unlicensed band.

First, a channel access method for downlink transmission through multiple carriers is described according to an embodiment of the present disclosure. For convenience of description, it is assumed that a base station uses two carriers, but the embodiment of the present disclosure is applicable to a case in which a base station uses three or more carriers.

In the Type-A channel access for downlink transmission according to an embodiment of the present disclosure, the base station may perform the above-described category 4 LBT for each LBT subband. Specifically, the base station may apply the above-described Type-A channel access in the LTE LAA, for each LBT subband, rather than each carrier. In addition, the Type-A channel access for downlink transmission according to an embodiment of the present disclosure may be divided into Type-A1 channel access and Type-A2 channel access.

In the Type-A1 channel access for downlink transmission according to an embodiment of the present disclosure, the base station may independently maintain and manage a CW for each LBT subband. Specifically, the base station may independently maintain and manage a CW for each LBT subband, regardless of the number of carriers used for channel access and a carrier in which the LBT subband is included.

When the base station maintains and manages multiple backoff counters, the base station may not selectively reduce one or more backoff counters. Specifically, when the backoff counter has a value equal to or larger than 1, the base station may not selectively reduce the corresponding backoff counter. Accordingly, the base station may synchronize transmission time points in the multiple carriers. The operation of the base station may be referred to as self-deferral.

A self-deferral method which may be performed by the base station in the Type-A1 channel access for downlink transmission is described. In the first embodiment, the base station may perform self-deferral for each LBT subband regardless of a carrier including the LBT subband for performing channel access. In this embodiment, the base station may perform self-deferral in consideration of simultaneous transmission of all LBT subbands. In the embodiment, a case in which channel sensing may be influenced by RF leakage occurring in an adjacent carrier is considered. However, when the base station performs transmission in consideration of simultaneous transmission of all LBT subbands, a transmission delay may increase.

In the second embodiment, the base station may perform self-deferral in each carrier. Specifically, the base station may perform self-deferral in consideration of a backoff counter of another LBT subband composing a carrier in which the LBT subband for performing self-deferral is included, without considering a backoff counter of an LBT subband composing a carrier other than the corresponding carrier. In this embodiment, it is considered that there may be a large impact by RF leakage between LBT subbands composing a BWP belonging to each carrier. In this embodiment, the base station may perform self-deferral in consideration of simultaneous transmission of all LBT subbands composing one carrier. In a case in which the base station performs self-deferral in consideration of simultaneous transmission of all LBT subbands composing one carrier, a transmission delay may be short compared to a case in which the base station performs self-deferral in consideration of simultaneous transmission of all LBT subbands regardless of a carrier.

In the Type-A2 channel access for downlink transmission according to an embodiment of the present disclosure, the base station may independently maintain and manage a CW for each LBT subband. In this case, the base station may apply one common integer as an initial value of a backoff counter of each of multiple LBT subbands. Embodiments below are applicable to an operation of acquiring the initial value of the backoff counter by the base station.

In the first embodiment, the base station may obtain (draw) a random integer from uniform distribution within the largest value among a CW corresponding to each of the multiple LBT subbands in which channel access is performed, and commonly apply the obtained random integer as an initial value of a backoff counter of each of all LBT subbands. Specifically, the base station may acquire a random integer from uniform distribution within the largest value among a CW corresponding to each of the multiple LBT subbands in which channel access is performed, regardless of the number of carriers used for channel access and a carrier in which the LBT subband is included, and may commonly configure the obtained random integer as an initial value of a backoff counter of each of all LBT subbands. In the embodiment, a case in which channel sensing may be influenced by RF leakage occurring in an adjacent carrier is considered. In this embodiment, since a common value in all LBT subbands managed by the base station is configured as an initial value of the backoff counter, the base station may relatively easily perform LBT subband simultaneous transmission. However, since the initial value of the backoff counter is configured within the largest value among all CWs managed by the base station, a relatively long delay may occur during channel access.

In the second embodiment, the base station may acquire a random integer for each carrier from uniform distribution within the largest CW among CWs corresponding to one or more LBT subbands within a carrier, and may commonly configure the obtained random integer as an initial value of a backoff counter of each of the one or more LBT subbands composing the corresponding carrier. In this embodiment, it is considered that there may a large impact by RF leakage between LBT subbands composing a BWP. In this embodiment, the base station may perform self-deferral in consideration of simultaneous transmission of all LBT subbands composing one carrier. In addition, in this embodiment, an initial value of the backoff counter is configured with reference to the largest value among the CW maintained within the carrier, and simultaneous transmission using multiple LBT subbands composing the carrier is considered, and thus a transmission delay may be shorter compared to the above-described first embodiment.

In the Type-B channel access for downlink transmission according to an embodiment of the present disclosure, the base station performs the above-described Category 4 channel access in one of LBT subbands in which channel access is performed. In this case, the base station may select an LBT subband for performing the Category 4 channel access from among the LBT subbands in which channel access is performed. Specifically, the base station may perform the Category 4 channel access in one of the LBT subbands in which channel access is performed, regardless of the number of carriers used for channel access and a carrier in which the LBT subband is included. When the base station has successfully performed channel access in the selected LBT subband, the base station may determine whether LBT subbands of carriers, which remain after excluding the selected LBT subband from the multiple LBT subbands, are idle for a predesignated duration immediately before transmission. In this case, the base station may perform transmission in the selected LBT subband and the LBT subbands that are idle for the predesignated duration immediately before transmission. The predesignated duration may be 25 us. Specifically, the base station may perform channel access by applying the Type-B channel access in the LTE LAA for each LBT subband, rather than for each carrier.

In another specific embodiment, the base station may select an LBT subband for each carrier in which channel access is performed, and perform the Category 4 channel access in each selected LBT subband for each carrier. When the base station has successfully performed channel access in the LBT subband selected for each carrier, the base station may determine whether LBT subbands remaining after excluding the selected LBT subband from multiple LBT subbands in each carrier are idle for a predesignated duration immediately before transmission. In this case, the base station may perform transmission in the selected LBT subband and the LBT subbands that are idle for the predesignated duration immediately before transmission. The predesignated duration may be 25 us. Specifically, the base station may perform channel access by applying the above-described Type-B channel access in the LTE LAA for each LBT subband in a carrier, rather than for each carrier.

In the Type-B1 channel access for downlink transmission according to an embodiment of the present disclosure, the base station may perform channel access by selecting one LBT subband from among LBT subbands for performing channel access. In this case, the base station may maintain and manage one CW. Specifically, the base station may perform the Category 4 LBT by using one CW regardless of the number of carriers and a carrier in which an LBT subband is included. The base station may adjust the CW on the basis of HARQ-ACK feedback on transmission in all carriers. In this case, the base station may adjust the CW on the basis of the ratio of NACKs or the ratio of ACKs as HARQ-ACK feedback on the transmission in all carriers. When the base station adjusts the CW on the basis of the ratio of NACKs, the base station may reduce or reset the size of the CW according to the ratio of NACKs in the HARQ-ACK feedback on the transmission in all carriers. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, specifically, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In the Type-B2 channel access for downlink transmission according to an embodiment of the present disclosure, the base station may perform the Category 4 channel access by using one LBT subband for each carrier. When the base station adjusts the size of the CW for each carrier, the base station may adjust the size of the CW on the basis of the HARQ-ACK feedback on the transmission in multiple LBT subbands belonging to the corresponding carrier. That is, when the base station adjusts the size of the CW corresponding to a carrier, the base station may consider only HARQ-ACK feedback on transmission in multiple LBT subbands belonging to each carrier, without considering HARQ-ACK feedback on transmission in other carriers.

Specifically, the base station may reduce or reset the size of the CW corresponding to the corresponding carrier, according to the ratio of NACKs or the ratio of ACKs as the HARQ-ACK feedback on the transmission in multiple LBT subbands belonging to each carrier. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, the base station may obtain one common backoff counter for each carrier while maintaining and managing a CW for the Category 4 channel access for each LBT subband in a BWP of each carrier. The base station may obtain a random integer from uniform distribution within the largest CW among CWs corresponding to one or more LBT subbands in a carrier, and commonly configure the obtained random integer as an initial value of a backoff counter of each of the one or more LBT subbands composing the corresponding carrier. When the base station adjusts the size of the CW for each LBT subband within the BWP of each carrier, the base station may adjust the size of the CW on the basis of HARQ-ACK feedback on transmission in the corresponding LBT subband. That is, when the base station adjusts the size of the CW corresponding to one LBT subband, the base station may not consider HARQ-ACK feedback on transmission in other LBT subbands. Specifically, the base station may reduce or reset the size of the CW corresponding to the corresponding LBT subband, according to the ratio of NACKs or the ratio of ACKs in the HARQ-ACK feedback on the transmission in the LBT subband. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, the base station may maintain and manage one CW for each carrier and obtain one common backoff counter for different carriers. Specifically, the base station may obtain a random integer from uniform distribution within the largest CW among CWs managed by the base station for each carrier, and may commonly configure the obtained integer as an initial value of a backoff counter of each of one or more LBT subbands composing each carrier. In this embodiment, the base station may perform self-deferral to stand by for transmission in different carriers. Accordingly, in this embodiment, the probability that the base station may perform simultaneous transmission in multiple carriers may increase.

As described above, since the bandwidth of a carrier in the LTE LAA is 20 MHz and LBT is performed for each carrier, in the case of the Type-B channel access, the Category 4 channel access is performed in one carrier randomly selected by using uniform probability. In the Type-B channel access for downlink transmission according to an embodiment of the present disclosure, the base station may randomly select one of all LBT subbands in which channel access performed, by using uniform probability, and may perform the Category 4 channel access in the selected LBT subband. However, the number of LBT subbands composing the BWP of each carrier may not be uniform. Accordingly, according to this embodiment, the Category 4 channel access may be intensively performed in a specific carrier. In another specific embodiment, the base station may randomly select one LBT subband for each carrier by using uniform probability and randomly select one of all selected LBT subbands by using uniform probability.

According to an embodiment of the present disclosure, a channel access method for uplink transmission through multiple carriers is described. For convenience of description, it is assumed that a terminal uses two carriers, but the embodiment of the present disclosure is applicable to a case in which a terminal uses three or more carriers. In addition, one or more BWPs may be configured in each carrier.

In Type-A channel access for uplink transmission according to an embodiment of the present disclosure, the terminal may perform the above-described category 4 LBT for each LBT subband. Specifically, the terminal may apply the above-described Type-A channel access in the LTE LAA, for each LBT subband, rather than each carrier. In addition, the Type-A channel access for uplink transmission according to an embodiment of the present disclosure may be divided into Type-A1 channel access and Type-A2 channel access.

In the Type-A1 channel access for uplink transmission according to an embodiment of the present disclosure, the terminal may independently maintain and manage a CW for each LBT subband. Specifically, the terminal may independently maintain and manage a CW for each LBT subband, regardless of the number of carriers used for channel access and a carrier in which the LBT subband is included. When the terminal performs the uplink transmission according to scheduling of the base station, the terminal may attempt channel access according to the LBT type indicated by the base station. In this case, the LBT type indicated by the base station may be the above-described Category 4 channel access. In addition, the LBT type indicated by the base station may correspond to single period LBT in which it is determined that the channel access has been successfully performed when the channel is idle for a single period having a predesignated duration. In this case, the predesignated duration may be 25 us or 16 us. Specifically, the single period LBT may correspond to the above-described Category 2 channel access. In addition, the LBT type indicated by the base station may correspond to “no LBT”, that is, immediate transmission without channel sensing. In the embodiments to be described below, a case in which the terminal performs the Category 4 LBT is assumed. This case includes a case in which the LBT type indicated by the base station corresponds to the Category 4 LBT. In addition, the embodiments to be described below may correspond to a case in which uplink transmission is performed on the basis of an LBT subband in which a resource scheduled for the terminal from the base station is included or an LBT subband in which a resource configured through RRC configuration is included.

In the Type-A1 channel access for uplink transmission according to an embodiment of the present disclosure, the terminal may independently maintain and manage a CW for each LBT subband. Specifically, the terminal may independently maintain and manage a CW for each LBT subband, regardless of the number of carriers used for channel access and a carrier in which the LBT subband is included.

When the terminal maintains and manages multiple backoff counters, the terminal may not selectively reduce one or more backoff counters. Specifically, when the backoff counter has a value equal to or larger than 1, the terminal may not selectively reduce the corresponding backoff counter. Accordingly, the terminal may synchronize transmission time points in the multiple carriers. The operation of the terminal may be referred to as self-deferral.

A self-deferral method which may be performed by the terminal in the Type-A1 channel access for uplink transmission is described. In the first embodiment, the terminal may perform self-deferral for each LBT subband regardless of a carrier including the LBT subband for performing channel access. In this embodiment, the terminal may perform self-deferral in consideration of simultaneous transmission of all LBT subbands. In the embodiment, a case in which channel sensing may be influenced by RF leakage occurring in an adjacent carrier is considered. However, when the terminal performs transmission in consideration of simultaneous transmission of all LBT subbands, a transmission delay may increase.

In the second embodiment, the terminal may perform self-deferral in each carrier. Specifically, the terminal may perform self-deferral in consideration of a backoff counter of another LBT subband composing a carrier in which the LBT subband for performing self-deferral is included, without considering a backoff counter of an LBT subband composing a carrier other than the corresponding carrier. In this embodiment, it is considered that there may be a large impact by RF leakage between LBT subbands composing a BWP belonging to each carrier. In this embodiment, the terminal may perform self-deferral in consideration of simultaneous transmission of all LBT subbands composing one carrier. In a case in which the terminal performs self-deferral in consideration of simultaneous transmission of all LBT subbands composing one carrier, a transmission delay may be shorter compared to a case in which the terminal performs self-deferral in consideration of simultaneous transmission of all LBT subbands regardless of a carrier.

In the Type-A2 channel access for uplink transmission according to an embodiment of the present disclosure, the terminal may independently maintain and manage a CW for each LBT subband. In this case, the terminal may commonly apply one integer as an initial value of a backoff counter of each of multiple LBT subbands. Embodiments below are applicable to an operation of obtaining the initial value of the backoff counter by the terminal.

In the first embodiment, the terminal may obtain a random integer from uniform distribution within the largest value among a CW corresponding to each of the multiple LBT subbands in which channel access is performed, and commonly apply the obtained random integer as an initial value of a backoff counter of each of all LBT subbands. Specifically, the terminal may obtain a random integer from uniform distribution within the largest value among a CW corresponding to each of the multiple LBT subbands in which channel access is performed, regardless of the number of carriers used for channel access and a carrier in which the LBT subband is included, and may commonly configure the obtained random integer as an initial value of a backoff counter of each of all LBT subbands. In the embodiment, it is considered that channel sensing may be influenced by RF leakage occurring in an adjacent carrier. In this embodiment, since a common value in all LBT subbands managed by the terminal is configured as an initial value of the backoff counter, the terminal may relatively easily perform LBT subband simultaneous transmission. However, since the initial value of the backoff counter is configured within the largest value among all CWs managed by the terminal, a relatively long delay may occur during channel access.

In the second embodiment, the terminal may obtain a random integer for each carrier from uniform distribution within the largest CW among CWs corresponding to one or more LBT subbands within a carrier, and may commonly configure the obtained random integer as an initial value of a backoff counter of each of the one or more LBT subbands composing the corresponding carrier. In this embodiment, it is considered that there may be a large impact by RF leakage between LBT subbands composing a BWP. In this embodiment, the terminal may perform self-deferral in consideration of simultaneous transmission of all LBT subbands composing one carrier. In addition, in this embodiment, an initial value of the backoff counter is configured with reference to the largest value among the CW maintained within the carrier, and simultaneous transmission using multiple LBT subbands composing the carrier is considered, and thus a transmission delay may be shorter compared to the above-described first embodiment.

In the Type-B channel access for uplink transmission according to an embodiment of the present disclosure, the terminal may perform the above-described Category 4 channel access in one of LBT subbands in which channel access is performed. In this case, the terminal may select one of the multiple LBT subbands in which channel access is performed, as an LBT subband for performing the Category 4 channel access. Specifically, the terminal may perform the Category 4 channel access in one of the LBT subbands in which channel access is performed, regardless of the number of carriers used for channel access and a carrier in which the LBT subband is included. When the terminal has successfully performed channel access in the selected LBT subband, the terminal may determine whether LBT subbands of carriers, which remain after excluding the selected LBT subband from the multiple LBT subbands, are idle for a predesignated duration immediately before transmission. In this case, the terminal may perform transmission in the selected LBT and the LBT subbands that are idle for the predesignated duration immediately before transmission. The predesignated duration may be 25 us. Specifically, the terminal may perform channel access by applying the above-described Type-B channel access in the LTE LAA for each LBT subband, rather than for each carrier.

In another specific embodiment, the terminal may select an LBT subband for each carrier in which channel access is performed, and perform the Category 4 channel access in each selected LBT subband for each carrier. When the terminal has successfully performed channel access in the LBT subband selected for each carrier, the terminal may determine whether LBT subbands remaining after excluding the selected LBT subband from multiple LBT subbands in each carrier are idle for a predesignated duration immediately before transmission. In this case, the terminal may perform transmission in the selected LBT subband and the LBT subbands that are idle for the predesignated duration immediately before transmission. The predesignated duration may be 25 us. Specifically, the terminal may perform channel access by applying the above-described Type-B channel access in the LTE LAA for each LBT subband in a carrier, rather than for each carrier.

In the Type-B1 channel access for uplink transmission according to an embodiment of the present disclosure, the terminal may perform channel access by selecting one LBT subband among LBT subbands for performing channel access. In this case, the terminal may maintain and manage one CW. Specifically, the terminal may perform the Category 4 LBT by using one CW regardless of the number of carriers and a carrier in which an LBT subband is included. The terminal may adjust the CW on the basis of HARQ-ACK feedback on transmission in all carriers. When new data indication (NDI) is received as HARQ-ACK feedback on uplink transmission in an LBT subband in which uplink transmission is performed using the Category 4 channel access, the terminal may adjust a CW value for all priority classes on the basis of the NDI. Specifically, when the NDI indicates transmission of new data, the terminal may reset a CW value (Cwp) for all priority classes to the minimum value (Cwmin,p) of a CW for the corresponding priority class. When the NDI is toggled, the NDI may indicate transmission of new data. In addition, when the NDI does not indicate transmission of new data, the terminal may configure, as the CW value (CWp) for all priority classes, the next largest value of a current CW value among values allowed as CW values (CWp) for the corresponding priority class. When the NDI does not indicate transmission of new data and the current CW value is the maximum value (CWmax,p) for the corresponding priority class, the terminal may configure, as the CW value (CWp) for all priority classes, the maximum value (CWmax,p) of the CW for the corresponding priority class. The NDI received from the base station for uplink transmission performed using the Category 4 channel access by the terminal may correspond to NDI for at least one HARQ-process-ID associated with HARQ-ID-ref. A scheme of configuring the HARQ-ID-ref may follow the above-described CWS updating procedure.

In the Type-B2 channel access for uplink transmission according to an embodiment of the present disclosure, the terminal may perform the Category 4 channel access by using one LBT subband for each carrier. When the terminal adjusts the size of the CW for each carrier, the terminal may adjust the size of the CW on the basis of the NDI as feedback on transmission in multiple LBT subbands belonging to the corresponding carrier. That is, when adjusting the size of a CW corresponding to a carrier, the terminal may consider NDI only as feedback on transmission in multiple LBT subbands belonging to each carrier, and may not consider the NDI as feedback on transmission in other carriers. Specifically, the terminal may reduce or reset the size of the CW corresponding to the corresponding carrier, according to a value of the NDI as feedback on transmission in multiple LBT subband belonging to each carrier. Specifically, when the NDI indicates transmission of new data, the terminal may reset the CW value (CWp) for all priority classes to the minimum value (CWmin,p) of the CW for the corresponding priority. When the NDI is toggled, the NDI may indicate transmission of new data. In addition, when the NDI does not indicate transmission of new data, the terminal may configure, as a CW value (CWp) for all priority classes, the next largest value of a current CW value among values allowed as CW values (CWp) for the corresponding priority class. When the NDI does not indicate transmission of new data and the current CW value is the maximum value (CWmax,p) for the corresponding priority class, the terminal may configure, as the CW value (CWp) for all priority classes, the maximum value (CWmax,p) of the CW for the corresponding priority class. The NDI transmitted by the base station for uplink transmission performed using the Category 4 channel access by the terminal may correspond to NDI for at least one HARQ-process-ID associated with HARQ-ID-ref. A scheme of configuring the HARQ-ID-ref may follow the above-described CWS updating procedure.

In another specific embodiment, the terminal may obtain one common backoff counter for each carrier while maintaining and managing a CW for the Category 4 channel access for each LBT subband in a BWP of each carrier. The terminal may obtain a random integer from uniform distribution within the largest CW among CWs corresponding to one or more LBT subbands in a carrier, and commonly configure the obtained random integer as an initial value of a backoff counter of each of the one or more LBT subbands composing the corresponding carrier. When the terminal adjusts the size of the CW for each LBT subband within the BWP of each carrier, the terminal may adjust the size of the CW on the basis of NDI of feedback on transmission in the corresponding LBT subband. That is, when the terminal adjusts the size of the CW corresponding to one LBT subband, the terminal may not consider NDI of feedback on transmission in other LBT subbands. This may be identical to the above-described specific embodiment in which the terminal adjusts the CW according to the NDI. Accordingly, description thereof is omitted.

In another specific embodiment, the terminal may maintain and manage one CW for each carrier and obtain one common backoff counter for different carriers. Specifically, the terminal may obtain a random integer from uniform distribution within the largest CW among CWs managed by the base station for each carrier, and may commonly configure the obtained integer as an initial value of a backoff counter of each of one or more LBT subbands composing each carrier. In this embodiment, the terminal may perform self-deferral to stand by for transmission in different carriers. Accordingly, in this embodiment, the probability that the terminal may perform simultaneous transmission in multiple carriers may increase.

As described above, since the bandwidth of a carrier in the LTE LAA is 20 MHz and LBT is performed for each carrier, in the case of the Type-B channel access, the Category 4 channel access is performed in one carrier randomly selected by using uniform probability. In the Type-B channel access for uplink transmission according to an embodiment of the present disclosure, the terminal may randomly select one of all LBT subbands in which channel access performed, by using uniform probability, and may perform the Category 4 channel access in the selected LBT subband. However, the number of LBT subbands composing the BWP of each carrier may not be uniform. Accordingly, according to this embodiment, the Category 4 channel access may be intensively performed in a specific carrier. In another specific embodiment, the terminal may randomly select one LBT subband for each carrier by using uniform probability and randomly select one of all selected LBT subbands by using uniform probability.

Figure 20:
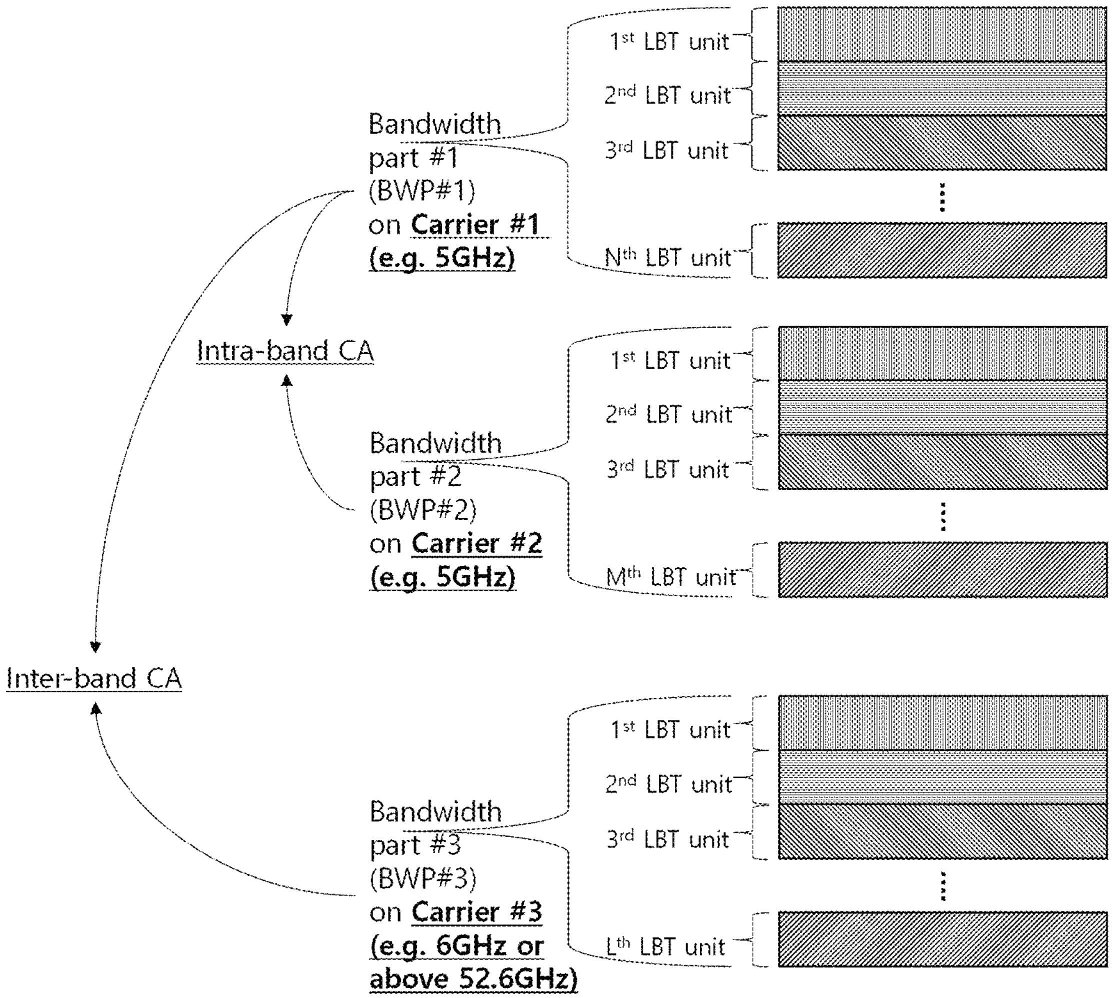
FIG. 20 illustrates a channel access method when carrier aggregation (CA) is performed according to an embodiment of the present disclosure.

FIG. 20 illustrates a channel access method when carrier aggregation (CA) is performed according to an embodiment of the present disclosure.

Carrier aggregation may be performed within the same band. In addition, carrier aggregation may be also performed among different bands. A band used in an embodiment of the present disclosure may be one of a 5 GHz band, a 6 GHz band, a 52.6 GHz band, and an unlicensed band. Accordingly, an embodiment to be described below is applicable when transmission using multiple carriers in the same band is performed or when transmission using multiple carriers belonging to different bands, respectively, is performed. In addition, a case in which a BWP including one or more LBT subbands is configured is assumed.

Described is a method for adjusting a CW in a case where the CA is performed in the same band and a BWP including one or more LBT subbands is configured for each of multiple carriers in which the CA is performed, or a BWP including one or more LBT subbands is configured for each of multiple carriers in the same band. When self-carrier scheduling is performed, the base station may use all HARQ-ACK values corresponding to a data channel scheduled by a control channel transmitted in a carrier in which the self-carrier scheduling is performed, so as to calculate the ratio of NACKs among HARQ-ACK feedback, and may adjust the size of the CW according to the calculated ratio of NACKs or ratio of ACKs. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range. In this case, when the terminal has failed to detect the HARQ-ACK feedback or has detected feedback indicating DTX, the base station may count the corresponding HARQ-ACK feedback as NACK.

Described is a case in which the CA is performed in the same band and cross-carrier scheduling is performed. The base station my use all HARQ-ACK values corresponding to a data channel transmitted in the second carrier that is a carrier scheduled by a control channel transmitted in the first carrier, so as to calculate the ratio of NACKs among HARQ-ACK feedback, and may adjust the size of the CW according to the calculated ratio of NACKs or ratio of ACKs. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range. In the same band, information on a channel state and channel congestion may be similar, and thus all HARQ-ACK values are used for calculating the ratio of NACKs, regardless of using self-carrier scheduling or cross-carrier scheduling.

In a case in which the wireless communication apparatus manages a CW for each carrier or manages a CW in units of LBT subbands of each carrier, when cross-carrier scheduling is applied, one of the following embodiments may be applied.

When a control channel is transmitted in the first carrier and a data channel is transmitted in the second carrier, the base station may perform the Category 4 channel access procedure in each of the first carrier and the second carrier. In this case, the base station may calculate the ratio of NACKs among HARQ-ACK feedback by using all HARQ-ACK feedback values associated with the data channel transmitted in the second carrier, and may adjust the size of the CW of each carrier according to the calculated ratio of NACKs or ratio of ACKs. The base station may use all HARQ-ACK feedbacks associated with the data channel transmitted in the second carrier, which are transmitted from the terminal to the base station, so as to calculate the ratio of NACKs for each of the first carrier and the second carrier, and may adjust the size of the CW of each carrier according to the calculated ratio of NACKs or ratio of ACKs. Specifically, the base station may calculate the ratio of NACKs or the ratio of ACKs for the first carrier by using all HARQ-ACK values, and may adjust the size of the CW of the first carrier according to the calculated ratio of NACKs or ratio of ACKs. The base station may calculate the ratio of NACKs or the ratio of ACKs for the second carrier by using all HARQ-ACK values, and may adjust the size of the CW of the second carrier according to the calculated ratio of NACKs or ratio of ACKs. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, even though a control channel is transmitted in the first carrier and a data channel is transmitted in the second carrier, the base station may apply the ratio of NACKs or the ratio of ACKs among HARQ-ACK feedback, which is calculated by using all HARQ-ACK values associated with the data channel transmitted in the second carrier, only when adjusting the size of the CW in the second carrier. That is, when adjusting the size of the CW in the first carrier, the base station may not apply the ratio of NACKs or the ratio of ACKs among HARQ-ACK feedback, which is calculated by using all HARQ-ACK values associated with the data channel transmitted in the second carrier. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, when a control channel is transmitted in the first carrier and a data channel is transmitted in the second carrier, the base station may calculate the ratio of NACKs among HARQ-ACK feedback by using only an HARQ-ACK feedback value associated with the control channel and the data channel transmitted in each carrier, and may adjust the size of the CW of the corresponding carrier according to the calculated ratio of NACKs or ratio of ACKs. Specifically, the base station may calculate the ratio of NACKs or the ratio of ACKs for the first carrier by using the HARQ-ACK value associated with the control channel transmitted in the first carrier, and may adjust the size of the CW of the first carrier according to the calculated ratio of NACKs or ratio of ACKs. The base station may calculate the ratio of NACKs or the ratio of ACKs for the second carrier by using the HARQ-ACK value associated with the data channel transmitted in the second carrier, and may adjust the size of the CW of the second carrier according to the calculated ratio of NACKs or ratio of ACKs. This embodiment may correspond to a case where DTX has occurred due to the failure in receiving the control channel by the terminal when the base station has failed to detect the HARQ-ACK feedback on transmission of the data channel scheduled through the control channel. The base station may count the corresponding DTX for the ratio of NACKs or the ratio of ACKs for the first carrier in which the control channel is transmitted, and may adjust the size of the CW of the first carrier according to the calculated ratio of NACKs or ratio of ACKs for the first carrier. In addition, this embodiment may correspond to a case where DTX has occurred since the terminal has failed to receive the data channel or the terminal has successfully received the control channel and has transmitted HARQ-ACK feedback to the base station but the base station has failed to detect the corresponding ACK/NACK. The base station may count the corresponding DTX for the ratio of NACKs or the ratio of ACKs for the first carrier in which the control channel is transmitted, and may adjust the size of the CW of the first carrier according to the calculated ratio of NACKs or ratio of ACKs for the first carrier. In another specific embodiment, the base station may use only an HARQ-ACK value transmitted in one of the first carrier and the second carrier so as to calculate the ratio of NACKs among the HARQ-ACK feedback.

Described is an embodiment of the present disclosure, which is applicable to a case where CA is performed among multiple carriers in different bands and cross-carrier scheduling is performed. There is high possibility that there is no similarity between pieces of information on a channel state and channel congestion in different bands. Accordingly, in the cross-carrier scheduling performed among different bands, a method for adjusting the size of the CW in consideration of no similarity described above is required.

The base station may manage a CW for each carrier or in units of LBT subbands. This is because there is high possibility that there is no similarity between pieces of information on a channel state and channel congestion in different bands, as descried above.

When a control channel is transmitted in the first carrier and a data channel is transmitted in the second carrier, the base station may perform the Category 4 channel access procedure in each of the first carrier and the second carrier. In this case, the base station may calculate the ratio of NACKs among HARQ-ACK feedback by using all HARQ-ACK feedback values associated with the data channel transmitted in the second carrier, and may adjust the size of the CW of each carrier according to the calculated ratio of NACKs or ratio of ACKs. The base station may use all HARQ-ACK feedbacks associated with the data channel transmitted in the second carrier, which are transmitted from the terminal to the base station, so as to calculate the ratio of NACKs for each of the first carrier and the second carrier, and may adjust the size of the CW of each carrier according to the calculated ratio of NACKs or ratio of ACKs. Specifically, the base station may calculate the ratio of NACKs or the ratio of ACKs for the first carrier by using all HARQ-ACK values, and may adjust the size of the CW of the first carrier according to the calculated ratio of NACKs or ratio of ACKs. The base station may calculate the ratio of NACKs or the ratio of ACKs for the second carrier by using all HARQ-ACK values, and may adjust the size of the CW of the second carrier according to the calculated ratio of NACKs or ratio of ACKs. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, even though a control channel is transmitted in the first carrier and a data channel is transmitted in the second carrier, the base station may apply the ratio of NACKs or the ratio of ACKs among HARQ-ACK feedback, which is calculated using all HARQ-ACK values associated with the data channel transmitted in the second carrier, only when adjusting the size of the CW in the second carrier. That is, when adjusting the size of the CW in the first carrier, the base station may not apply the ratio of NACKs or the ratio of ACKs among HARQ-ACK feedback, which is calculated using all HARQ-ACK values associated with the data channel transmitted in the second carrier. In this case, a value equal to higher than 0% to a value equal to lower than 100% may be used as the ratio of NACKs. When the ratio of NACKs does not correspond to 100%, the base station may reset the size of the CW. Otherwise, the base station may increase the size of the CW to a value within the next allowed CW range. In addition, when the base station adjusts the size of the CW on the basis of the ratio of ACKs, the base station may reduce or reset the size of the CW according to the ratio of ACKs in the HARQ-ACK feedback on the transmission in all carriers. When at least one ACK is generated, the base station may reset the size of the CW. Otherwise, the base station may increase the size of the CW to a value within the next allowed CW range.

In another specific embodiment, when a control channel is transmitted in the first carrier and a data channel is transmitted in the second carrier, the base station may calculate the ratio of NACKs among HARQ-ACK feedback by using only an HARQ-ACK feedback value associated with the control channel and the data channel transmitted in each carrier, and may adjust the size of the CW of the corresponding carrier according to the calculated ratio of NACKs or ratio of ACKs. Specifically, the base station may calculate the ratio of NACKs or the ratio of ACKs for the first carrier by using the HARQ-ACK value associated with the control channel transmitted in the first carrier, and may adjust the size of the CW of the first carrier according to the calculated ratio of NACKs or ratio of ACKs. The base station may calculate the ratio of NACKs or the ratio of ACKs for the second carrier by using the HARQ-ACK value associated with the data channel transmitted in the second carrier, and may adjust the size of the CW of the second carrier according to the calculated ratio of NACKs or ratio of ACKs. This embodiment may correspond to a case where DTX has occurred due to the failure in receiving the control channel by the terminal when the base station has failed to detect the HARQ-ACK feedback on transmission of the data channel scheduled through the control channel. The base station may count the corresponding DTX for the ratio of NACKs or the ratio of ACKs for the first carrier in which the control channel is transmitted, and may adjust the size of the CW of the first carrier according to the calculated ratio of NACKs or ratio of ACKs for the first carrier. In addition, this embodiment may correspond to a case where DTX has occurred since the terminal has failed to receive the data channel or the terminal has successfully received the control channel and has transmitted HARQ-ACK feedback to the base station but the base station has failed to detect the corresponding ACK/NACK. The base station may count the corresponding DTX for the ratio of NACKs or the ratio of ACKs for the first carrier in which the control channel is transmitted, and may adjust the size of the CW of the first carrier according to the calculated ratio of NACKs or ratio of ACKs for the first carrier. In another specific embodiment, the base station may use only an HARQ-ACK value transmitted in one of the first carrier and the second carrier so as to calculate the ratio of NACKs among the HARQ-ACK feedback.

Figure 21:
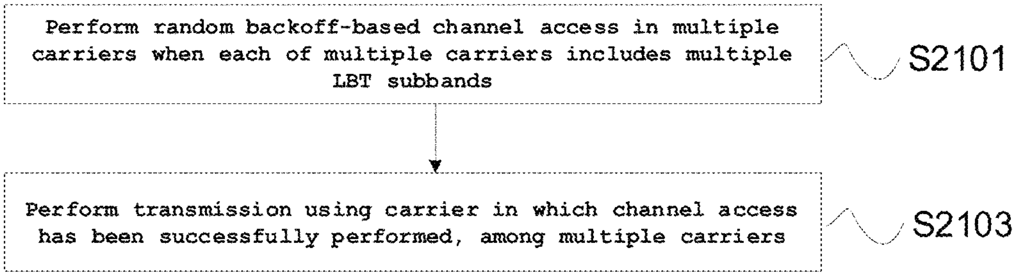
FIG. 21 illustrates performing channel access by a wireless communication apparatus in an unlicensed band according to an embodiment of the present disclosure.

FIG. 21 illustrates performing channel access by a wireless communication apparatus in an unlicensed band according to an embodiment of the present disclosure.

According to an embodiment of the present disclosure, when each of multiple carriers includes multiple LBT subbands, a wireless communication apparatus may perform random backoff-based channel access in the multiple carriers (operation S2101). The wireless communication apparatus performs transmission using a carrier in which channel access has been successfully performed (operation S2103), among the multiple carriers. In this case, the random backoff-based channel access may correspond to the above-described Category 4 channel access.

In random backoff-based channel access, a wireless communication apparatus may configure, as a backoff counter initial value, a random integer obtained from uniform distribution within a contention window (CW). In this case, the wireless communication apparatus may maintain and manage a size of at least one CW for each of multiple carriers.

In addition, the wireless communication apparatus may perform the random backoff-based channel access for each carrier in each of the multiple carriers. Specifically, the wireless communication apparatus may maintain and manage multiple backoff counters corresponding to multiple LBT subbands, respectively, the multiple LBT subbands composing each of the multiple carriers. When the multiple carriers include a first carrier which includes an LBT subband corresponding to a first backoff counter, and a second carrier which does not include an LBT subband corresponding to the first backoff counter, the wireless communication apparatus may selectively reduce a value of the first backoff counter on the basis of a value of a backoff counter corresponding to the LBT subband composing the first carrier, regardless of a value of a backoff counter corresponding to the LBT subband composing the second carrier.

When maintaining and managing multiple CWs corresponding to the multiple LBT subbands, the wireless communication apparatus may obtain a random integer from uniform distribution within a largest value among the multiple CWs corresponding to the multiple LBT subbands, and configure the obtained random integer as a common initial value of the multiple backoff counters corresponding to the multiple LBT subbands.

In these embodiments, a detailed operation of the wireless communication apparatus may follow the above-described embodiments of the Type-A channel access.

In another specific embodiment, a wireless communication apparatus may select one LBT subband for each of multiple carriers, and perform the random backoff-based channel access in the selected LBT subband. The wireless communication apparatus may maintain only one CW in each of the multiple carriers, and adjust the size of a CW in each of the multiple carriers on the basis of whether transmission has been successfully done in each of the multiple carriers.

In another specific embodiment, a wireless communication apparatus may randomly select, as an LBT subband for each carrier, one of multiple LBT subbands composing each of multiple carriers, from each of the multiple carriers by using uniform probability, and may randomly select, as an LBT subband for random backoff-based channel access, one of the multiple LBT subbands for each carrier by using the uniform probability. The wireless communication apparatus may perform the random backoff-based channel access in the LBT subband for the random backoff-based channel access In these embodiments, a detailed operation of the wireless communication apparatus may follow the above-described embodiments of the Type-B channel access.

A method and system of the present disclosure are described in relation to a specific embodiment, but some or all of the elements or operations thereof may be implemented using a computing system having a universal hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A wireless communication apparatus configured to perform wireless communication in an unlicensed band, the wireless communication apparatus comprising:

a communication module; and a processor configured to control the communication module, wherein the processor is configured to:

perform a first transmission using a plurality of listen before talk (LBT) sub-bands within a bandwidth part (BWP) that is a part of a carrier, wherein the plurality of LBT sub-bands includes a first LBT sub-band and a second LBT sub-band, wherein the first LBT sub-band and the second LBT sub-band are consecutive, perform a second transmission using a single LBT sub-band, wherein the single LBT sub-band is the first LBT sub-band or the second LBT sub-band, receive a first hybrid automatic repeat request acknowledgement (HARQ-ACK) feedback corresponding to the first transmission using the first LBT sub-band and the second LBT sub-band, receive a second HARQ-ACK feedback corresponding to the second transmission using only the single LBT sub-band, and adjust a contention window (CW) value for the single LBT sub-band, based on both the first HARQ-ACK feedback and the second HARQ-ACK feedback.

2. The wireless communication apparatus of claim 1, wherein the processor is configured to:

perform a channel access based on the CW value, perform a third transmission using the single LBT sub-band, based on the channel access.

3. The wireless communication apparatus of claim 2, wherein the channel access for the single LBT sub-band is performed applying an initial value, the initial value being a random integer uniformly distributed within the CW value.

4. A wireless communication apparatus configured to perform wireless communication in an unlicensed band, the apparatus comprising:

a communication module; and a processor configured to control the communication module, wherein the processor is configured to:

perform a first reception using a plurality of listen before talk (LBT) sub-bands within a bandwidth part (BWP) that is a part of a carrier, wherein the plurality of LBT sub-bands includes a first LBT sub-band and a second LBT sub-band, wherein the first LBT sub-band and the second LBT sub-band are consecutive, perform a second reception using a single LBT sub-band, wherein the single LBT sub-band is the first LBT sub-band or the second LBT sub-band, transmit a first hybrid automatic repeat request acknowledgement (HARQ-ACK) feedback corresponding to the first reception using the first LBT sub-band and the second LBT sub-band, transmit a second HARQ-ACK feedback corresponding to the second reception using only the single LBT sub-band, perform a third reception using the single LBT sub-band in which a channel access has been successfully performed, wherein the channel access is performed based on a contention window (CW) value for the single LBT sub-band, and the CW value for the single LBT sub-band is adjusted based on both the first HARQ-ACK feedback and the second HARQ-ACK feedback.

5. A method of a wireless communication apparatus configured to perform wireless communication in an unlicensed band, the method comprising:

performing a first transmission using a plurality of listen before talk (LBT) sub-bands within a bandwidth part (BWP) (bandwidth-part) that is a part of a carrier, wherein the plurality of LBT sub-bands includes a first LBT sub-band and a second LBT sub-band, wherein the first LBT sub-band and the second LBT sub-band are consecutive;

performing a second transmission using a single LBT sub-band, wherein the single LBT sub-band is the first LBT sub-band or the second LBT sub-band;

receiving a first hybrid automatic repeat request acknowledgement (HARQ-ACK) feedback corresponding to the first transmission using the first LBT sub-band and the second LBT sub-band;

receiving a second HARQ-ACK feedback corresponding to the second transmission using only the single LBT sub-band; and adjusting a contention window (CW) value for the single LBT sub-band, based on both the first HARQ-ACK feedback and the second HARQ-ACK feedback.

6. The method of claim 5, further comprising:

performing a channel access based on the CW value;

performing a third transmission using the single LBT sub-band, based on the channel access.

7. The method of claim 6, wherein the channel access for the single LBT sub-band is performed applying an initial value, the initial value being a random integer uniformly distributed within the CW value.

* * * * *